US010922093B2

(12) United States Patent
Kienle

(10) Patent No.: US 10,922,093 B2
(45) Date of Patent: *Feb. 16, 2021

(54) DATA PROCESSING DEVICE, PROCESSOR CORE ARRAY AND METHOD FOR CHARACTERIZING BEHAVIOR OF EQUIPMENT UNDER OBSERVATION

(71) Applicant: Blue Yonder Group, Inc., Scottsdale, AZ (US)

(72) Inventor: Frank Kienle, Karlsruhe (DE)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,313

(22) Filed: Nov. 18, 2019

(65) Prior Publication Data

US 2020/0089510 A1 Mar. 19, 2020

Related U.S. Application Data

(63) Continuation of application No. 16/229,283, filed on Dec. 21, 2018, now Pat. No. 10,481,923, which is a
(Continued)

(30) Foreign Application Priority Data

Dec. 5, 2013 (EP) .................... 13195858
Dec. 5, 2013 (EP) .................... 13195861

(51) Int. Cl.
*G06F 9/44* (2018.01)
*G06F 9/445* (2018.01)
(Continued)

(52) U.S. Cl.
CPC ....... *G06F 9/44505* (2013.01); *G05B 19/042* (2013.01); *G06F 11/3024* (2013.01); *G06F 11/3409* (2013.01)

(58) Field of Classification Search
None
See application file for complete search history.

(56) References Cited

U.S. PATENT DOCUMENTS 3,964,055 A 6/1976 Carruet et al.
4,096,571 A 6/1978 Vander Mey
(Continued)

FOREIGN PATENT DOCUMENTS

EP 1703636 B1 11/2008
EP 2047425 B1 9/2011
(Continued)

OTHER PUBLICATIONS

European Search Report. Application No. EP13195861, dated May 19, 2014. 1 page.
(Continued)

*Primary Examiner* — Tan T. Nguyen
(74) *Attorney, Agent, or Firm* — Spencer Fane LLP; Steven J. Laureanti

(57) ABSTRACT

A data processing device (100) characterizes behavior properties of equipment under observation (105). The device (100) has a plurality of processing units that are adapted to process input values (a) to output values (e) according to numerical transfer functions. The functions implement an input-to-output mapping specified by a configuration (C) that is obtained by pre-processing historic data (114) from a plurality of master equipment (104). The configuration is related to the behavior properties of the equipment (105) so that some of the output values (e) represent the behavior properties of the equipment (105) under observation.

20 Claims, 16 Drawing Sheets

Related U.S. Application Data continuation of application No. 14/561,203, filed on Dec. 4, 2014, now Pat. No. 10,169,051.

(51) Int. Cl.
*G05B 19/042* (2006.01)
*G06F 11/30* (2006.01)
*G06F 11/34* (2006.01)

(56) References Cited

U.S. PATENT DOCUMENTS

| | | | |
|---|---|---|---|
| 5,093,826 | A | 3/1992 | Leichum |
| 5,701,482 | A | 12/1997 | Harrison et al. |
| 5,737,215 | A | 4/1998 | Schricker et al. |
| 6,611,755 | B1 | 8/2003 | Coffee et al. |
| 6,836,767 | B2 | 12/2004 | McBride |
| 7,493,477 | B2 | 2/2009 | Velhal et al. |
| 7,685,354 | B1 | 3/2010 | Hetherington et al. |
| 7,853,431 | B2 | 12/2010 | Samardzija et al. |
| 7,865,333 | B2 * | 1/2011 | Becker ............ G05B 23/0278 702/183 |
| 7,882,394 | B2 | 2/2011 | Hosek et al. |
| 7,899,591 | B2 | 3/2011 | Shah et al. |
| 8,015,565 | B2 | 9/2011 | Doing et al. |
| 8,140,503 | B2 | 3/2012 | Ichino |
| 8,255,919 | B2 | 8/2012 | Beverly et al. |
| 8,311,858 | B2 | 11/2012 | Everett et al. |
| 8,326,577 | B2 | 12/2012 | Graham, III et al. |
| 8,565,943 | B2 | 10/2013 | Weinmann |
| 8,650,340 | B2 | 2/2014 | Yan et al. |
| 8,739,165 | B2 | 5/2014 | Russell et al. |
| 8,887,008 | B2 | 11/2014 | Hosking et al. |
| 8,903,593 | B1 | 12/2014 | Addepalli et al. |
| 8,914,795 | B2 | 12/2014 | Osogami et al. |
| 9,043,522 | B2 | 5/2015 | Kennedy et al. |
| 9,104,650 | B2 | 8/2015 | Hosek et al. |
| 9,110,452 | B2 | 8/2015 | Blevins et al. |
| 9,164,807 | B2 | 10/2015 | Blanc et al. |
| 9,256,470 | B1 | 2/2016 | Garg et al. |
| 9,317,978 | B2 | 4/2016 | Hiruta et al. |
| 9,501,804 | B2 | 11/2016 | Kaufman |
| 9,685,009 | B2 | 6/2017 | Sprock et al. |
| 9,710,311 | B2 | 7/2017 | Nagao et al. |
| 9,799,149 | B2 | 10/2017 | Davidson |
| 9,818,136 | B1 | 11/2017 | Hoffberg |
| 2002/0107873 | A1 | 8/2002 | Winkler et al. |
| 2003/0115019 | A1 * | 6/2003 | Doddek ............ G05B 23/0235 702/183 |
| 2004/0044452 | A1 | 3/2004 | Bauer et al. |
| 2006/0181427 | A1 * | 8/2006 | Bouse ............ G05B 19/4065 340/657 |
| 2008/0140361 | A1 * | 6/2008 | Bonissone ............ G06N 5/04 703/2 |
| 2009/0312983 | A1 * | 12/2009 | Lee ............ G06F 11/3466 702/180 |
| 2011/0301988 | A1 | 12/2011 | Staaf |
| 2011/0301992 | A1 | 12/2011 | Staaf |
| 2012/0283989 | A1 * | 11/2012 | Hirohata ............ H04L 41/145 702/180 |
| 2013/0253853 | A1 * | 9/2013 | Wunderlin ............ G05B 23/0283 702/42 |
| 2014/0073946 | A1 | 3/2014 | Rodriguez-Llorente et al. |
| 2014/0100817 | A1 * | 4/2014 | Jump ............ G06Q 50/02 702/180 |
| 2016/0117466 | A1 * | 4/2016 | Singh ............ G06Q 50/265 702/19 |

FOREIGN PATENT DOCUMENTS

| | | |
|---|---|---|
| EP | 1507181 B1 | 10/2011 |
| WO | WO2007/008940 A2 | 1/2007 |
| WO | WO2012089579 A1 | 7/2012 |
| WO | WO2013115431 A1 | 8/2013 |

OTHER PUBLICATIONS

European Search Report. Application No. EP13195858, dated May 15, 2014. 1 page.

\* cited by examiner

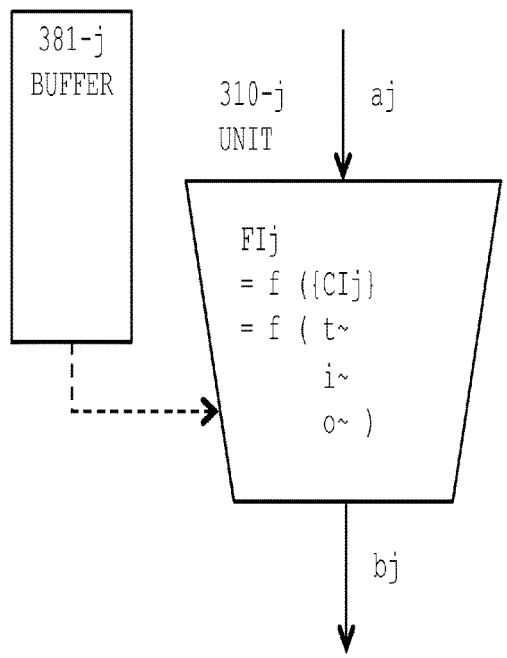
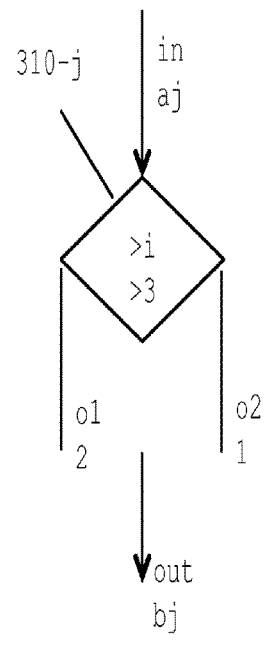
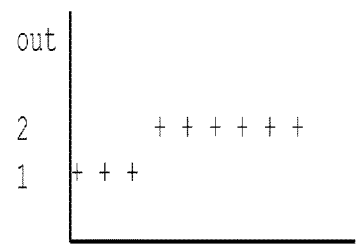
TRANSFER FUNCTION FIj
FIG. 3A    FIG. 3B

| action | | option(a) (processing device) | option(b) (core array) |
|---|---|---|---|
| 1010 collect historic data | equipment 104 | N/A | N/A |
| 1020 pre-process to {{C}} | processing configurator 115 | N/A | N/A |
| 1030 allocate resources | | N/A | select cores assign memory |
| 1040 provide {F} | | program FPGA wire logics | distribute function and instructions to cores |
| 1050 load {{C}} | | load to buffers | load to registers, buffers, memory |
| 1060 process data | | process | process |

FIG. 10A 1000

DATA PROCESSING DEVICE, PROCESSOR CORE ARRAY AND METHOD FOR CHARACTERIZING BEHAVIOR OF EQUIPMENT UNDER OBSERVATION

CROSS-REFERENCE TO RELATED APPLICATIONS

This application is a continuation of U.S. patent application Ser. No. 16/229,283, filed on Dec. 21, 2018, entitled "Data Processing Device, Processor Core Array And Method For Characterizing Behavior Of Equipment Under Observation," which is a continuation of U.S. patent application Ser. No. 14/561,203, filed on Dec. 4, 2014, entitled "Data Processing Device, Processor Core Array And Method For Characterizing Behavior Of Equipment Under Observation," now U.S. Pat. No. 10,169,051, which claims benefit of priority to European Application Nos. EP13195858 and EP13195861 filed Dec. 5, 2013. U.S. patent application Ser. No. 16/229,283 and U.S. Pat. No. 10,169,051 are assigned to the assignee of the present application. The subject matter disclosed in U.S. patent application Ser. No. 16/229,283, U.S. Pat. No. 10,169,051, and European Application Nos. EP13195858 and EP13195861 are hereby incorporated by reference into the present disclosure as if fully set forth herein.

TECHNICAL FIELD

The present invention generally relates to data processing, and more in particular relates to data processing for characterizing the behavior of equipment.

BACKGROUND

Operators of industrial machines, vehicles, mobile devices—or technical equipment in general—need to ensure proper and safe operation of the equipment. As some constructional components can suddenly fail, sensors can alert the operator in critical situations. For example, the technical equipment can be a turbine in a power plant. Dedicated sensors are provided at bearings and other critical components of the turbine. Computers process the sensor data to alert the operator—often in situations that have become critical already.

Processing data from further sensors could help to detect or to predict behavioral trends of the equipment. This allows alerting the operator even if the situation is not yet critical. In the example, a non-typical rotation of the turbine rotor might be detected by evaluating data from sensors in the proximity of the turbine. Such data includes acoustical data from a microphone sensor.

However, the multi-sensor approach is not free of technical problems. First, the sensors produce huge amounts of data. The order of magnitude of data can exceed some gigabytes per second. Processing data by a central processing unit (CPU) requires a high-bandwidth infrastructure between the sensors and the CPU to communicate the data to the CPU. Further, the time needed for processing is in contract with the operator's desire to see results in real-time. Second, different processing applications would use the same data to identify different trends. In the turbine example, a first processing application identifies non-typical rotation of the rotor, and a second processing application identifies non-typical oscillations in the blades. But using the same data requires intermediate storage of the data, again with computer infrastructure requirements.

SUMMARY

According to embodiments of the invention, a data processing device for characterizing behavior properties of equipment under observation comprises a plurality of processing units. The units are adapted to process input values to output values according to numerical transfer functions. The numerical transfer functions implement an input-to-output mapping specified by a configuration. The configuration is obtained by pre-processing historic data from a plurality of master equipment. The configuration is related to the behavior properties of the master equipment so that some of the output values represent the behavior properties of the equipment under observation.

Looking at the processing time or run-time of the device, characterizing the behavior properties can include to detect behavior that occurs prior to run-time (or substantially simultaneous at run-time), or to predict (or anticipate) behavior in the future. The device is specialized to process data by dedicated processing units. In the units, input-output mapping accommodates functional complexity that corresponds to the purpose of characterizing. But the processing device remains flexible to apply mapping with specific values. The plurality of such specific values—the configuration—corresponds to the particular behavior of the equipment to be characterized. The configuration is the result of pre-processing behavior probabilities from historic data. This pre-processing is shifted to computers outside the processing device. The outside computer is provided as a processing configurator. In other words, the configurator learns the probabilities and communicates the result to the processing device as the configuration prior to processing. As a consequence, the processing device provides the representation of the behavior substantially without delay at run-time, and the processing device remains flexible enough to adapt to different behavior properties by re-configuring. This enables, for example, the prediction of particular behavior properties of the equipment under observation in substantially real-time.

Changing the configuration can occur more frequently than changing the functions, this giving the effect of saving resource that would be required by the change.

In an embodiment, the plurality of processing units can be cascaded into a first processing stage and a second processing stage. The first processing stage has a plurality of first processing units that are adapted to receive a plurality of equipment data values from the equipment under observation as input and that are adapted to provide a plurality of intermediate data values as output according to a plurality of first numerical transfer functions. The second processing stage has a second processing unit that is adapted to receive the plurality of intermediate data values as input and adapted to provide behavior data as output according to a second numerical transfer function. This approach is advantageous in view of processing many or all data values from the equipment, but integrating the intermediate data value at the output to a result that can easily be further processed.

In an embodiment, the configuration of the transfer functions comprises stage configurations for the first and second processing stages. This approach provides flexibility in changing and updating the configurations.

In an embodiment, the data processing device can be adapted to distribute the configuration to the processing units by a configuration bus.

In an embodiment, the data processing device can comprise configuration buffers that are associated with the processing units and that are adapted to receive the configuration, and—optionally—to cache the configuration. However, buffering the equipment data values or buffering the intermediate data values is not required.

In an embodiment, the configuration buffers can be adapted to receive a configuration of a first processing context and to receive a configuration of a second processing context. The data processing device can be adapted to select the associated processing units to process data values accordingly. In combination with configuration buffering, the processing device can switch processing schemes at a speed that exceed the change rate of the input values. Therefore, identical input value can be used to monitor different behavior properties.

In an embodiment, the data processing device can be adapted to receive a selection signal to selectively activate the processing units to process data values according to the first processing context and to the second processing context. Such a selection signal consumes less bandwidth or memory resources than a re-configuration would consume.

In an embodiment, the data processing device can be adapted to receive the plurality of equipment data values through a multiplexer, while the configuration remains unchanged. This approach allows using the same processing device to substantially simultaneously monitor two or more pieces of equipment.

In an embodiment, the data processing device can be adapted to operate with prediction probabilities. Once a probability is introduced, for example a part of the configuration, intermediate data values of the next processing are probabilistic. The configuration can be regarded as a learned probability, a collection of probabilities that are derived from the historic data.

In an embodiment, the output data of the data processing device relates to the future behavior of the equipment under observation. In other words, a prediction of the behavior becomes possible.

In an embodiment, the processing units of the data processing device can be implemented in field programmable gate array (FPGA) technology. The transfer functions can be modified by reprogramming the FPGA. The configuration that specifies the input-to-output mapping of the functions is usually not modified. This approach accommodate different change frequencies: the functions are modified occasionally (in the FPGA) be reprogramming the fields, but the configuration can be updated as often as different behavior is to be looked at or a more suitable configuration becomes available.

In an embodiment, the processing units of the data processing device can be implemented by processor cores, or by separate processors. In that approach, an operation module allocates functions of the processing units to the processor cores according to the presence of equipment data values and the availability of the processor cores. The presence of equipment data values can be considered as a "load" that is imposed by the equipment to the device. This presence has at least two aspects. First, the number of input channels, or sensors that communicate data into the device is related to the number of processor cores. Second, the sampling rate by that new data values arrive with the time can be relevant as well. If needed, the operation module can cause the processor cores to serialize operation.

According to an embodiment, a computer-implemented method is provided to enable a data processing device to characterize behavior properties of equipment. In a collecting step, historic data are collected that relate to a fleet of equipment. At least one member of the fleet of equipment has a particular behavior property. In a pre-processing step, the historic data is processed to obtain a processing configuration that is related to the behavioral property of the fleet of equipment. In a loading stop, the configuration is loaded into processing units of the data processing device. The processing units has pre-defined mapping functions adapted to process data related to the particular equipment to a behavior descriptor for that particular equipment that shares behavioral properties with the fleet of equipment. The mapping functions are specialized by the configuration. Loading the configuration can be accompanied by forwarding the definitions of the mapping functions to the data processing device.

The data processing device can be implemented as a processor core array.

According to embodiments of the invention, a processor core array for characterizing behavior properties of equipment under observation is provided. The processor core array comprises a plurality of processor cores that implement an operation module to select processor cores as a subset of the plurality of microprocessor cores. The selected processor cores are adapted to process input values to output values according to numerical transfer functions with an input-to-output mapping specified by a configuration. The configuration is previously obtained by pre-processing historic data from a plurality of master equipment in relation to the behavior properties of the equipment under observation. The operation module is adapted to select the microprocessor cores from the plurality of microprocessors according to the availability of the cores and according to presence of equipment data values from the equipment under observation.

Looking at the processing time or run-time of the array, characterizing the behavior properties can include to detect behavior that occurs prior to run-time of the array (or substantially simultaneous at run-time), or to predict (or anticipate) behavior in the future. The array as instructed by the operation module becomes specialized to processing data by the processor cores that are selected. Input-output mapping accommodates functional complexity that corresponds to the purpose of characterizing. But the array remains flexible to apply mapping with specific values. The plurality of such specific value—the configuration—corresponds to the particular behavior of the equipment to be characterized. The configuration is the result of pre-processing behavior probabilities from historic data. This pre-processing is shifted to computers outside the array, that is to a processing configurator. In other words, the configurator learns the probabilities, and prior to processing the configurator communicates the result to the array as configuration. As a consequence, the array provides the representation of the behavior substantially without delay at run-time, and the array remains flexible enough to adapt to different behavior properties by re-configuring.

Changing the configuration can occur more frequently than changing the functions, this giving the effect of saving resource that would be required by the change.

In an embodiment, the operation module of the processor core array causes the selected processor cores to serialize operation, in case the number of selected processor cores is smaller than the number of equipment data values that are simultaneously present in parallel from the equipment under observation.

In an embodiment, the operation module selects cores to act as cores of a first processing stage and to act as cores of a second processing stage. The cores acting as the first processing stage receive a plurality of equipment data values from the equipment under observation as input and provide a plurality of intermediate data values as output, according to a plurality of first numerical transfer functions. The cores acting of the second processing stage receive the plurality of intermediate data values as input and provide behavior data as output according to a second numerical transfer function.

In an embodiment, the operation module causes the selected cores to operate as first and second processing stages sequentially. In other words, the cores of both stages are physically the same, and intermediate data values are temporarily stored.

In an embodiment, the configuration comprises stage configurations for the first and second processing stages. Having stage specific configurations contributes to flexibility.

In an embodiment, the operation module is adapted to assign data structures in memory to operate as configuration buffers and to associate the data structures with the selected cores to receive the configuration.

In an embodiment, the operation module assigns a data structure to receive a configuration of a first processing context and to receive a configuration of a second processing context. The processor core array selects the cores to process data values accordingly. This approach further contributes to flexibility, the operation of the array can be modified without changing the functions, so that re-programming the cores is not required.

In an embodiment, the output data relates to the future behavior of the equipment, so that prediction or anticipation of behavior becomes possible.

An embodiment provides a computer-implemented method for operating a processor core array to characterize behavior properties of equipment under observation. In an allocating step, resources are allocated by selecting processor cores of the processor core array according to an availability of the cores and according to the presence of equipment data values from the equipment under observation. In a receiving functions and providing functions step, the functions are received and forwarded to the selected processor cores as instructions. In a loading step, a configuration that specifies an input-to-output mapping of the functions is loaded to the selected cores. The configuration is obtained by pre-processing historic data from a plurality of master equipment, with the configuration being related to the behavior properties of the equipment under observation. Some of the output values of the array represent the behavior properties of the equipment under observation.

In an embodiment, receiving and providing the functions is repeated (by upgrading), and loading the configuration is repeated as well. But the time interval between repetitions is larger for receiving and providing than for loading. This approach contributes to resource saving. The functions can be receives as firmware for the array, and the configuration can be loaded into memory. In other words, there are different upgrade/update steps, for the functions and for the configurations, and the upgrade/update speed is different.

In an embodiment, receiving/providing the functions and loading the configuration can be combined. A single data file with instructions that are functions and that are configurations can be provided to the array.

An embodiment provides a computer-implemented method for characterizing behavior properties of equipment under observation. In a pre-processing step, historic data from a plurality of master equipment is pre-processed. In the plurality (or set, or fleet) of master equipment at least one element shows a particular behavior property. Pre-processing leads to a configuration that specifies an input-to-output mapping of a pre-determined numerical function set, wherein the numerical function set if specified by the configuration has an output indicative of the particular behavior property. In a providing step, instructions are provided to a computer. The instructions enable the computer to calculate the output according to the numerical function set. The numerical function set has with placeholders for the input-to-output mapping. In a loading step, the configuration with the input-to-output mapping is loaded to the computer to specify the function. In a processing step, equipment data values that are measured at an equipment under observation are processed according to the pre-determined numerical function specified by the configuration. Processing provides an output indicative of the particular behavior property of the equipment under observation.

In embodiments, computer program products are provided that—when loaded into a memory of a computer and being executed by at least one processor of the computer—perform the steps of the computer-implemented methods.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 3A to 3F illustrate block diagrams in combination with function diagrams to explain the operation of the processing units and the configuration buffers, according to an embodiment of the invention;

FIGS. 10A and 10B illustrate a table with actions and different processing options and a scenario with different time aspects, according to an embodiment of the invention.

DETAILED DESCRIPTION

Figure 1:
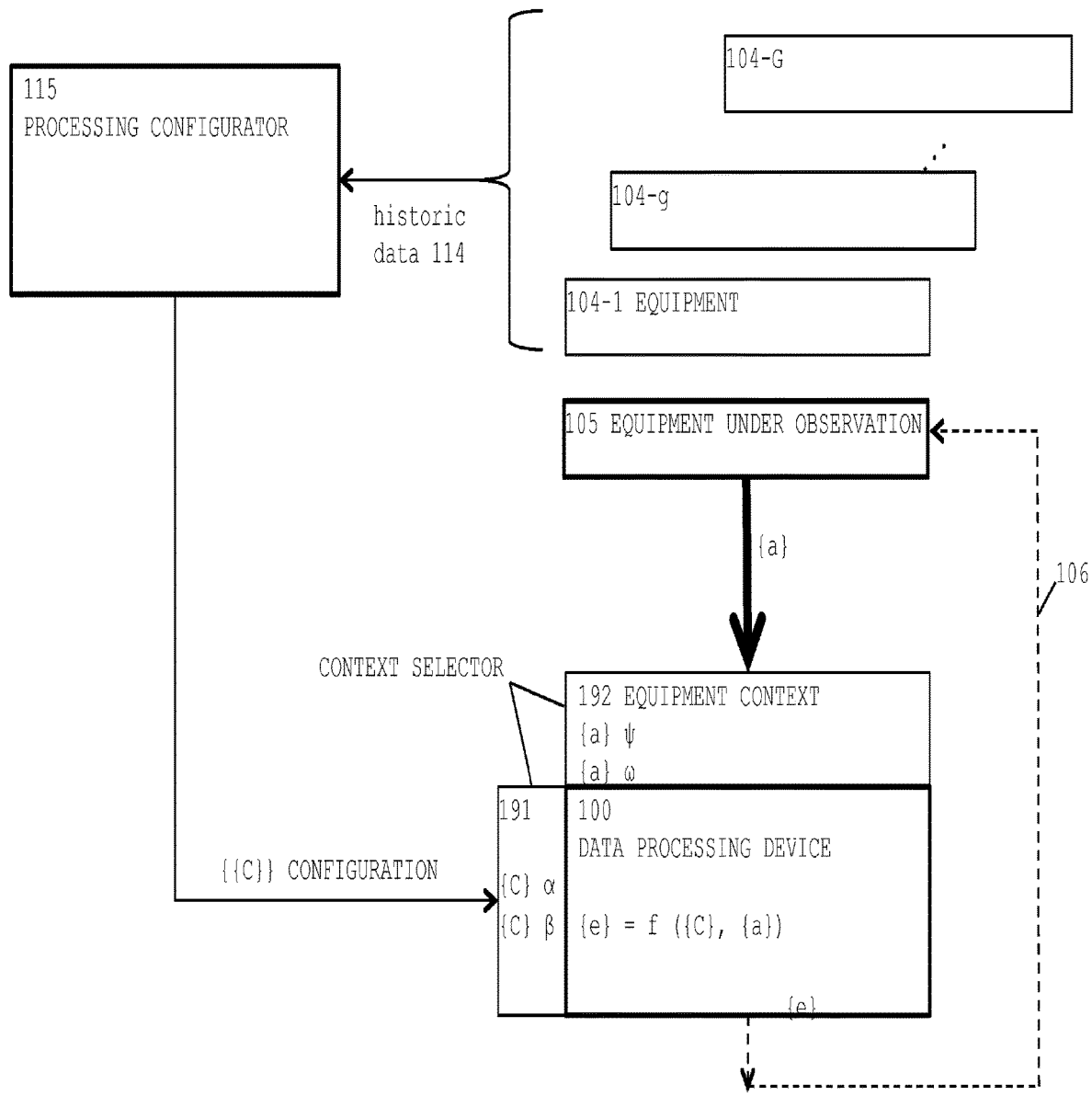
FIG. 1 illustrates a block diagram of an overall scenario with an equipment under observation, a data processing device, and a processing configurator, according to an embodiment of the invention.

FIG. 1 illustrates a block diagram of an overall scenario with equipment under observation 105 ("observed equipment"), data processing device 100 ("device"), and processing configurator 115. FIG. 1 also illustrates a plurality of master equipment 104-1 ... 104-g ... 104-G ("fleet 104, equipment 104"). The master equipment could also be considered as model, prototype, role model, standard or the like as it shows behavior properties ("behavior") that are to be detected or predicted for the observed equipment. Observed equipment 105 can belong to fleet 104, but this is not required.

Prior to the operation of device 100—at preparation time—processing configurator 115 receives historic data 114 from fleet 104 and pre-processes historic data 114 to configuration {{C}}. Configuration {{C}} corresponds to a behavior (or to a condition, or to an observation target) in observed equipment 105 that is of interest to be detected or predicted. The configuration {{C}} is loaded to device 100 prior to processing time. The configuration {{C}} contains a variety of control elements (or control instructions) to control the operation of device 100. The configuration {{C}} has multiple dimensions. Although {{C}} could be considered as a control vector or control matrix, the configuration {{C}} is not simply combined to equipment data by matrix multiplication. Instead, the configuration {{C}} is a set of purpose-tailored instructions to device 100.

During operation—at processing time (or "run-time")—device 100 receives a plurality of N equipment data values {a} from observed equipment 105. {a} can also be written as {a1 ... aj ... aN} and can be regarded as equipment message or equipment vector. Device 100 receives an equipment message {a} at every input time period. Optionally, the description indicates subsequent time periods by index [k], such as in {a}[1], {a}[2] and so forth. The time periods can optionally correspond to a clock cycle of the device.

Device 100 has processing stages (cf. FIGS. 2A and 2B) that implement numerical transfer functions. Device 100 processes the equipment data values {a} to equipment behavior data values {e}. The stages can have pluralities of processing units to process data in parallel. For example, the equipment data values form a vector {a} with N values in correspondence to the number of N processing units. Parallel processing is advantageous for rapid processing. The stages can be implemented such that the processing time per stage corresponds to the sampling time of the equipment data values (or fractions or multiples of that time), so that the device is substantially enabled to real-time processing.

The numerical transfer functions include a mapping functionality. The functionality is specified by the configuration {{C}}. Looking at device 100 as a whole, equipment behavior data {e} is a function of equipment data values {a} and the configuration {{C}}, that is:

{e}=function({{C}}, {a}).

Looking at the individual processing stages, the processing stages have a numerical transfer functions F (Stage) with input-output-mapping by that input values are related to output values. In an embodiment, each input value corresponds to a single determined output value. Optionally, the number of elements in the set of input values (input cardinality) can correspond to the number of elements in the set of output values (output cardinality). Mapping details are provided by a stage configurations ({CI} {CJ} and so on) that specify stage specific mapping to intermediate values, that is:

{b}=function ({CI}, {a});

{c}=function ({CJ}, {b}) and so on

Equipment behavior data {e} includes a behavior prediction for observed equipment 105. {e} can be further processed in feedback loop 106 to actually modify observed equipment 105. Feedback loop 106 can include a mechanism to alert to the operator of observed equipment 105 in case of critical situations.

Historic data 114 is based on physical phenomena that correspond to the behavior, but there is no need for identity with the behavior. Historic data 114 can be measurement data for the phenomena. The measurement data can be complemented (or even substituted) by data obtained by simulation. The simulation can be performed in configurator 115 or elsewhere. In case of simulation, historic data 114 can be data that actually refers to the future such as weather forecast data, or data that relates to the development of the equipment.

By deriving configuration {{C}}, configurator 115 makes device 100 sensitive to particular conditions of the equipment, for example, to characterize the behavior of the equipment as a behavior that tends to show a failure, an out-of-average energy consumption of the equipment etc. In other words, the configuration enables behavior prediction by the device.

The function includes operations such as, for example, threshold comparison, and it is possible to program the function into configuration {{C}}. However, it is advantageous to implement device 100 such that functions are hard-wired and that behavior specific details are provided by the configuration {{C}}.

Equipment behavior can be an overall characterization of the equipment with the goal to take corrective actions if needed. This includes changes of the behavior. The behavior can be obtained as a number of phenomena that are measured or otherwise determined. Changes in the phenomena can be indicative for behavior changes.

For example, fleet 104 comprises a number of G power plant turbines, and observed equipment 105 is a particular turbine that is in operation in a particular power plant. Processing configurator 115 has received historic data 114 from these G turbines and has provided configuration {{C}}. The configuration {{C}} is specific to detect the non-typical rotation of the turbine (as behavior property, at present, or in the past) or to predict non-typical rotation for the future.

Physical phenomena—that correspond to the non-typical rotation behavior—are for example, sound or vibration at typical frequencies. The sound is not identical with the behavior, but rather a consequence.

Equipment data values {a} are values from sensors that are associated with observed equipment 105 (e.g., the particular turbine). The sensors can be located on the turbine itself or in the vicinity of the turbine, and the sensors provide data relating to physical phenomena such as temperatures, vibration, rotation speed, sounds, chemical composition of gases. For simplicity it can be assumed that the number of sensors is N. Equipment data values {a} can be provided otherwise, for example, the overall operation time of the turbine that since installation at the power plant.

Other examples for fleet 104 and observed equipment 105 are cars or other vehicles. Device 100 is mounted on a particular car (105) and receives data from the sensors of the car. Particular behavior conditions could include the behavior of the car prior to an engine failure. In that sense, a particular behavior is detected at run-time (e.g., high mechanical friction at present), but this particular behavior can be typical for an engine failure in the future. In other words, engine failure can be predicted. The configuration {{C}} has been obtained by processing historic data from similar vehicles (that had operated normally and that suffered from engine failure).

Other examples are mobile phones (or mobile devices in general). From a technical perspective, the mobile phone should be prevented from downloading software updates while located in a geographic area with bandwidth constraints. The constraints can be due to insufficient telecommunication infrastructure in the area. From a business point of view, there can be agreements between telecommunication providers that are responsible for the infrastructure. The agreement might not allow certain phone users to download updates while visiting particular countries. Device 100 can monitor a variety of data, such as location, telecommunication data, or download activities. Device 100 can alert the phone user that downloading is no longer possible, or—more proactively—device 100 can detect that the user is approaching the border and can predict the download limitation. As a consequence, device 100 can optionally (cf. loop 106) trigger the phone to download the update at an earlier point in time (while in an area with sufficient infrastructure). Additional costs are thereby avoided.

The configuration {{C}} can be provided such that a particular behavior is detected by processing equipment data values {a} that are present at a single point in time.

As equipment data values {a} change over time, device 100 can receive {a} continuously. The description indicates the process of time by using index [k]. The configuration {{C}} can be provided for processing data that changes over time so that particular behavior is detected in such a way.

The configuration {{C}} can have functional elements (such as operands, function types, input values, output values) that are specific for the input values (i.e., specific for the sensors). For example, a configuration {C} 1 specific for input 1 (e.g., vibration sensor), {C} j for input j (e.g., rotation sensor) and so on. The functional values can be threshold values, for example, input thresholds. Prediction usually involves to process probabilities, so that input values, intermediate values, and output values can be probabilities. The functional elements of configuration {{C}} can be probabilities as well. The historic data 114—although no primarily consisting of probabilities—can be evaluated to derive a probability. There are many know approaches to do that, for example, machine learning, assisted machine learning etc.

The configuration {{C}} can represent mathematical operations to be performed, such as identifiers for a type of operation (e.g., value-to-threshold comparison) or identifiers for inputs/output operations inside device 100.

The configuration {{C}} can be provided in a programming language or as machine readable instructions. This is advantageous in embodiments that use processors or processor cores. Embodiments include instructions to be interpreted, instructions to be compiled to machine code, or combinations thereof.

The configuration {{C}} can include numerical values, such as value to define input values and output values.

Optionally, configuration {{C}} can comprise two or more different configuration contexts {{C}} α and {{C}} β. The contexts correspond to different conditions (i.e., behaviors) that could be detected by processing the same equipment data values {a} in a different way. In other words, switching the processing context allows re-using equipment data. Device 100 can sequentially process the data in a first mode (or first context type) and in a second mode (or second context type). To stay with the example of the turbine, condition α relates to predicted failure of a bearing, and condition β relates to the maintenance of the turbine, but the equipment data is the same. For α, the behavior data {e} can comprise alert information, and for β the behavior can comprise schedule information, for example, for re-schedule maintenance.

In FIG. 1, context switching is indicated by processing context selector 191 that selectively forwards {C} α and {C} β to device 100. It should be noted that context information can be stored, buffered or cached inside device 100 so that context switching can be reduced to a context selection (e.g., α or β), without re-loading.

Optionally, it is also possible to alternatively select different equipment data values {a} but to stay within the configuration {{C}}. In this case, equipment context selector 192 (or "multiplexer") alternates the equipment data values between {a} ψ (equipment 105) and {a} ω (different equipment). Again, in the turbine example, two particular turbines ψ and ω could be supervised.

Optionally, context selection of the processing context (α, β) and of the equipment context (ψ, ω) can be combined. Although the example uses binary contexts, contexts of higher order (with more than 2 configurations, more equipment) can also be used.

Device 100 can be implemented on a single semiconductor die or chip with very-largescale integration (VLSI). Using field programmable gate array (FPGA) technology is advantageous. FPGAs are commercially available, for example, from Xilinx Inc. San Jose, Calif., USA.

In combination with a computer, device 100 can be used as a prediction co-processor (or diagnostics co-processor) that is located on the same circuit board as the main processor. In embodiments with a higher integration density, device 100 can be co-located with the main processor on the same die. For example, device 100 can be a dedicated acceleration core in a system-on-chip (SoC) circuit.

Figure 2A:
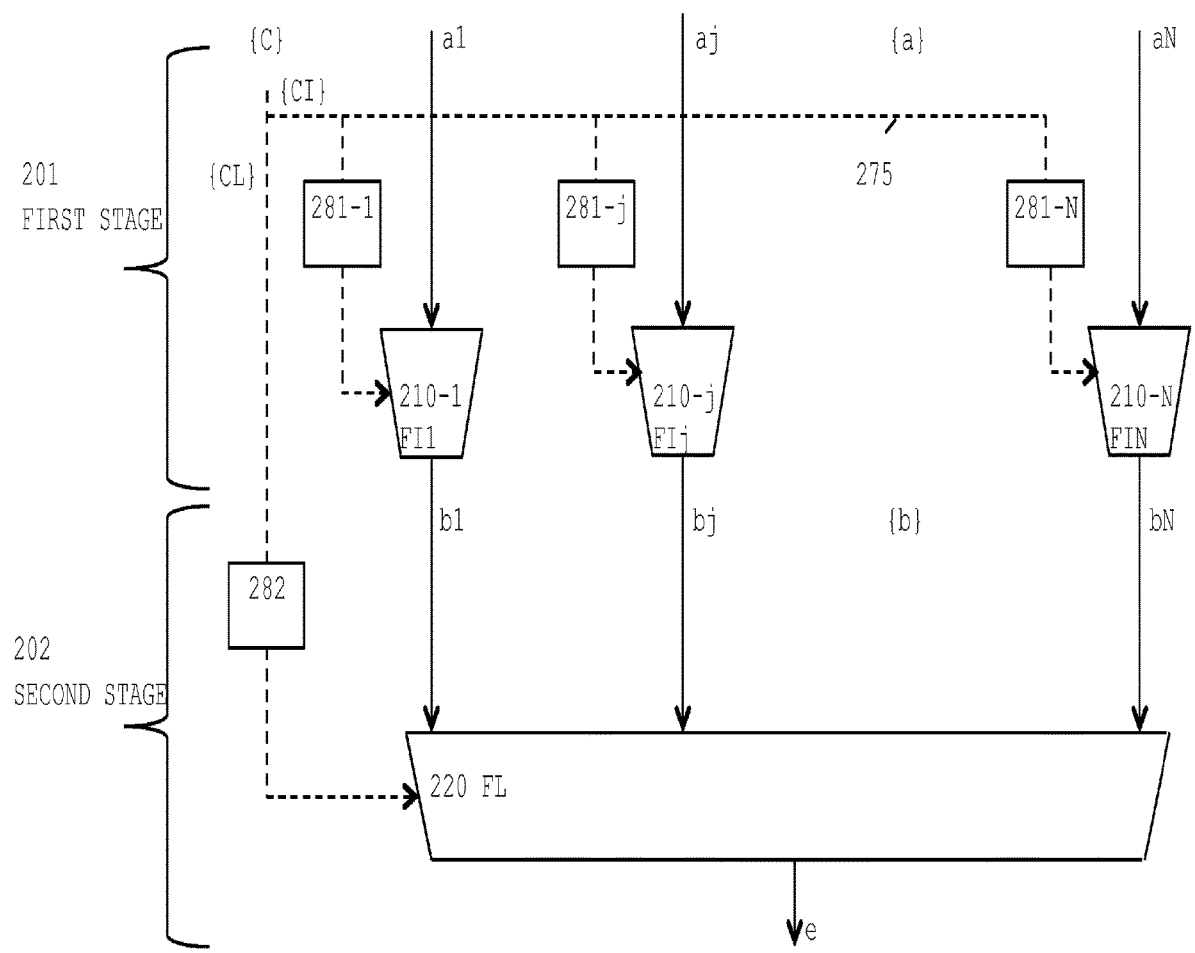
FIGS. 2A and 2B illustrate block diagrams of the data processing device with first and second processing stages that comprise processing units and configuration buffers, according to an embodiment of the invention.
Figure 2B:
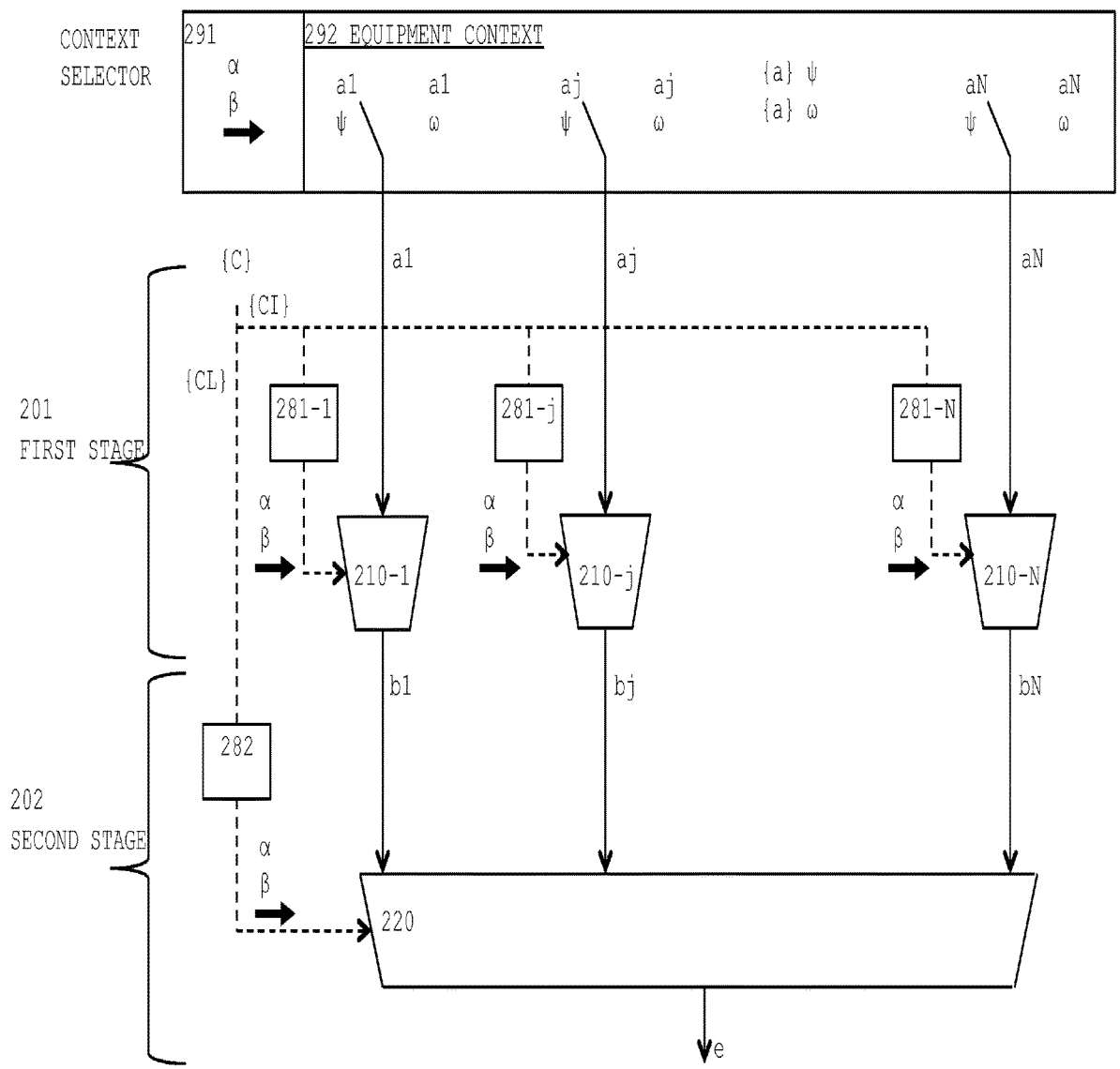

Having explained an overview, the description continues with more details. The focus will be on features that allow device 100 to perform prediction of equipment behavior in real-time (i.e. with insignificant delay or latency from receiving the equipment data). Such features are—among others—the following:

The architecture of device 100 allows parallel processing (e.g., N stages), cf. FIG. 2A, 2B. Functional specialization in the processing units (cf. FIGS. 3A and 3B) allows providing device 100 with relatively small physical dimensions. Therefore, device 100 can be located in physical proximity to observed equipment 105 (e.g., device next to the turbine) or as part of equipment 105 (e.g., device built into the car). The functional specification allows keeping configuration information {{C}} at a minimum (e.g., dedicated scalar transformer units instead of fully configurable processors). Buffers (cf. FIG. 2A, 2B) can temporarily store a configuration that is not needed for particular processing (e.g., store {{C}} α while {{C}} β is used). The buffers are arranged next to the processing units to let the processing units access the configuration directly (but not via time-consuming bus operations). Pipelining (i.e., operating the device in pipeline mode) is possible, especially in the example with a five-stage architecture (FIG. 9). Selecting processor cores prior to processing adapts device 100 to accommodate a variable number of equipment data values {a} (cf. FIG. 8). The processors can be procured "off the shelf". For example, 4-core processors ("quadcores") that are commercially available for mobile device ("smart phones") can be used.

The number of processing units can be different than the number N of equipment data value. It is possible to configure the input of device 100 in such a way that input channel (with data) are selectively switched on or off. The input configuration can be part of configuration ({{C}}). This approach contributes to save resource, for example, by reducing energy consumption of device.

FIGS. 2A and 2B illustrate block diagrams of device 200 (cf. device 100 in FIG. 1) with first processing stage 201 and second processing stage 202. First processing stage 201 has N processing units 210 . . . 210-$j$ . . . 210-N for initial processing ("I"), with numerical transfer functions FI1 . . . FI$j$ . . . FIN. Units 210-1 . . . 210-$j$ . . . 210-N receive equipment data values {a} { a1 . . . a$j$ . . . aN} as input and provide intermediate data values {b} {b1 . . . b$j$ . . . bN} as output.

In the embodiment illustrated in FIGS. 2A and 2B, the number N of data values {a} {b} corresponds to the number N of processing units, but this is not required.

Second processing stage 202 has processing unit 220 for final processing with numerical transfer function FL. In the example, function FL is a matrix multiplication of the N intermediate values to a scalar product. Configuration buffers 281-1 . . . 281-$j$ . . . 281-N are coupled to units 210-1 . . . 210-$j$ . . . 210-N, and configuration buffer 282 is coupled to unit 220. Configuration bus 275 illustrates the distribution of configuration {{C}} to the buffers.

The configuration {{C}} multidimensional: it has several components or elements, such as {CI} for the "initial processing" in stage 201, {CL} for the "final processing" (or "last processing") in stage 202. The stage configurations {CI} and {CL} can be further distinguished into configurations {CI1} for unit 210-1, {CI$j$} for unit 210-$j$ and so on. As explained in connection with FIGS. 3A to 3F, there are multiple elements to configure the units.

FIG. 2B illustrate a block diagram of the processing device with optional context switching.

Configuration buffer 281-1 . . . 281-$j$ . . . 281-N loads configuration {CI} α and {CI} β. Processing context selector 291 receives selection signal α or receives selection signal β (collectively "signal α, β"). Signal α, β goes to processing units 210-1 . . . 210-$j$ . . . 210-N directly (or via the buffers). Signal α, β is a control signal that lets the units process the data according to {CI} α or to {CI} β. Similarly, configuration buffer 282 loads configuration {CL} α and {CL} β. Signal α, β also goes to processing unit 220 and lets the unit process the data according to {CL} α or to {CL} β.

Such an approach allows using the same equipment data to detect or predict different behaviors of the equipment.

Optionally, equipment context selector 292—in the example implemented as a multiplexer—selectively forwards the different pluralities of equipment data values {a} ψ, {a1ψ . . . a$j$ψ . . . aNψ}

{a}ω, {a1ω . . . a$j$ω . . . aNω} to the processing units 210-1 . . . 210-$j$ . . . 210-N. The configuration {C} (with {CI}, {CL}) remains unchanged.

Such an approach allows using the processing device for different equipment. The behavior data would have to be multiplexed as well, to {e} ψ and to {e} ω. Due to processing delay from stage 201 to stage 202, signal α, β has to be applied to an output multiplexer with a time period offset.

It is also possible to combine processing context selector 291 and equipment context selector 292. Although context switching is illustrated with pairs α/β and ψ/ω, the principle can be applied to more than two alternatives. Loading a context can be deferred to the processing time. For example, processing could start with the α context to results {e}, but the β context can be added to the buffers at a later point in time.

FIGS. 3A to 3F illustrate block diagrams in combination with function diagrams to explain the operation of the processing units and the configuration buffers.

As mentioned, the processing units receive the configuration {{C}}, and the configuration {{C}} is stored or cached in the configuration buffers. The configuration {{C}} can contain elements that are related to a function type (t~), to the input of the processing units (i~), and to the output of the processing units (o~). There is no need to configure all 3 elements. Embodiments with fixed (non-configurable) elements are also possible.

Although the figures use writing conventions that relate to the first processing stage (such as index I for "initial"), the principles are applicable to the other stage(s) as well.

FIG. 3A illustrates configuration buffer 381-$j$ coupled to processing unit 310-$j$. In operation, processing unit 310-$j$ receives the input value (in) (e.g., an equipment data value a$j$) and provides the output value (out) (e.g., an intermediate value b$j$ in combination with further stages).

Unit 310-$j$ (and in principle the other units as well) implements a numerical transfer function FI$j$, with—in the example—"F" for "function", uppercase "I" for "initial" and with index $j$ indicating that the function can be specific to the input value the index $j$, for example, specific for a sensor $j$.

The numerical transfer function may have the elements
t~ to indicate a function type,
i~ to indicate values relating to the input, and
o~ to indicate values relating to the output.

Figure 3C:
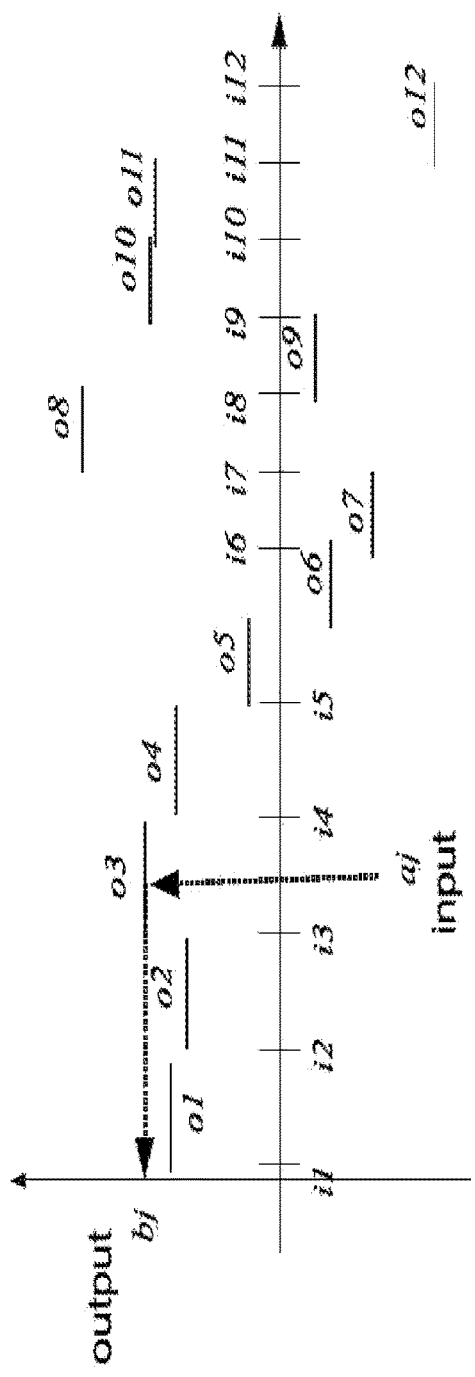

For convenience of explanation, the symbol "~" indicates that multiple types or values are possible (e.g., o1, o2 in FIG. 3B, o1 to o12 in FIG. 3C). The elements are specified by the configuration {CI$j$}. The description explains examples with the following figures.

The combination of processing unit and configuration buffer can be implemented in a variety of ways, among them combinational logic, look-up tables, or binary search trees. For example, combinational logic allows direct calculating without waiting time. For example, look-up tables are advantageous for multiple configuration elements. Binary search trees are advantageous for threshold implementations (cf. FIGS. 3A and 3B, etc.), wherein the configuration can include power-to-2-values (e.g., threshold 7, >4?, >4+2? etc.).

FIG. 3B illustrates an example for a configuration with element i~ being a single threshold, and element o~ having two output values, all integers. The configuration {CI$j$} specifies {i, o1, o2}={3, 2, 1}. There is no need to specify the function type t~ being a threshold. In the example for a hard-wired arrangement that only allows threshold functions. Such an approach is advantageous and enhances efficiency, for example in view of minimizing the layout area (on the die) small, increasing the data throughput, or increasing the package density. The graph illustrates the operation of the unit at processing time. For input values in=1, in=2, or in=3 (e.g., a$j$), the output (out) is 1, for input values in=4 to in=9 the output (out) is 2.

FIG. 3C illustrates an example with element t~ causing the unit to operate as a threshold function. Elements i~ and o~ are real values (e.g., floating point in hardware). Input elements are multiple thresholds i1 to i12 that are not equidistant, and output elements o~ are outputs o1 to o11 (in a corresponding number 12−1=11). In the example, the input (in) is a value between c3 and c4 so that the unit provides the output out=o3.

Figure 3D:
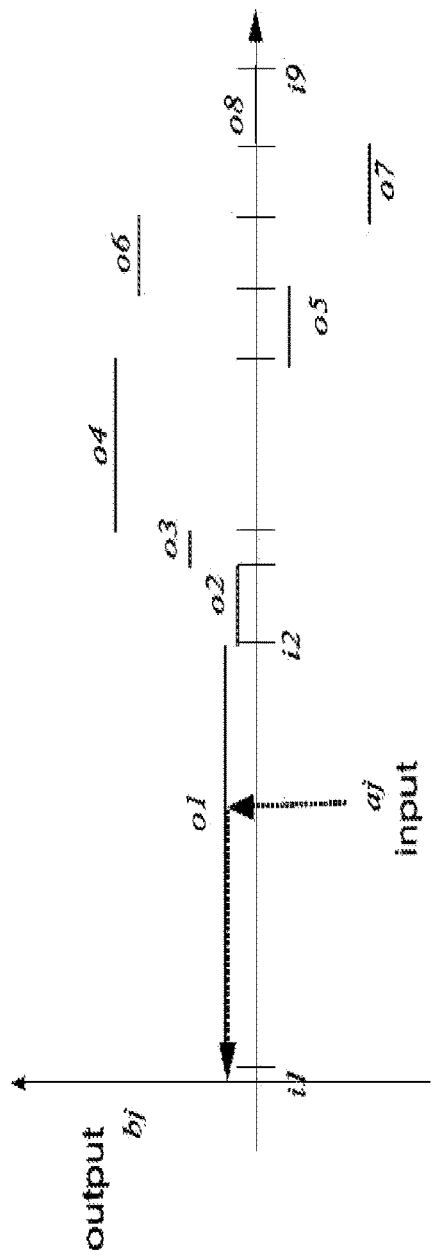

FIG. 3D gives a similar example, for the same function type, by for a different configuration. Processing device 100 could, for example, operate in configuration {C} α with the values of FIG. 3C and in configuration {C} β with the values of FIG. 3D.

Figure 3E:
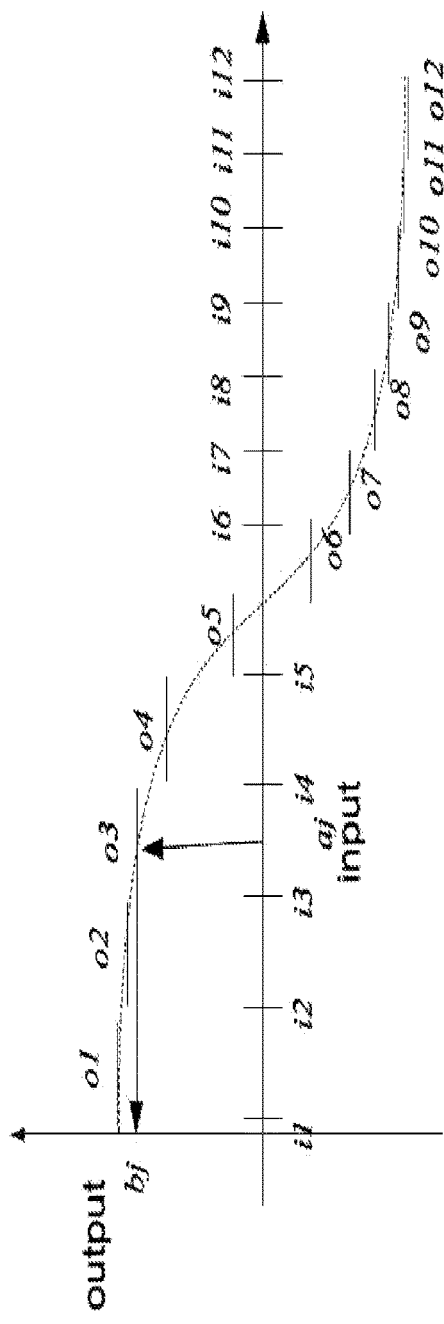

FIG. 3E gives an example for that the configuration {C} with the i and o values had been derived from a cosine function.

Figure 3F:
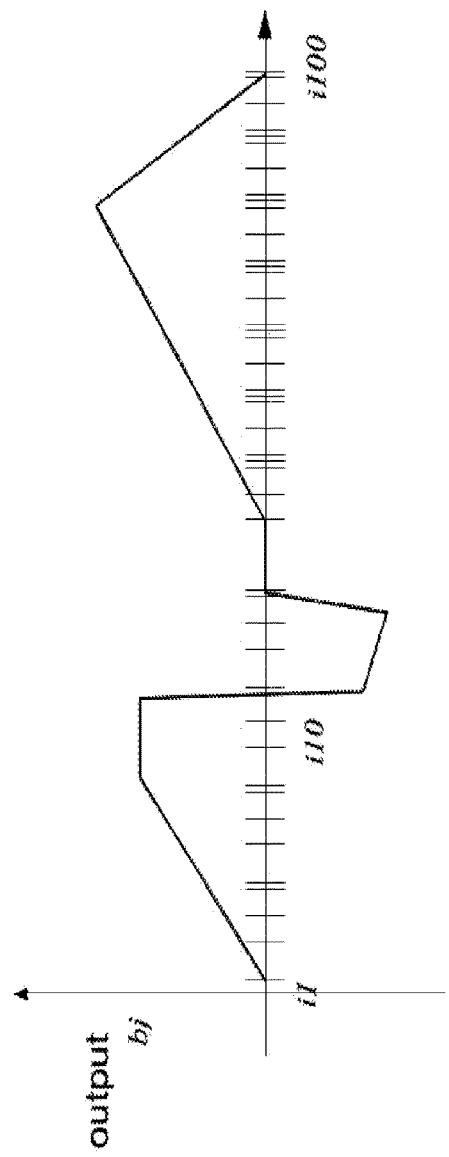

FIG. 3F gives an example with element t˜ indicating a threshold function that also includes linear calculation instructions. Input elements i˜ are defined as numbers i1, i2 . . . i100. Output elements o˜ are related to input elements i˜ by functions. For example, for i1<in<i10, the output out is calculated according to a linear relation (multiplication with a factor). For example, for i11<in<i13, the output has a constant value. The linear transfer function could be implemented as a lookup table.

Figure 4A:
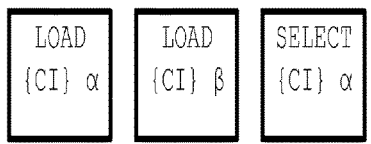
FIGS. 4A to 4C illustrate pipelining by time diagrams of the processing units and the configuration buffers to explain processing contexts and equipment contexts, according to an embodiment of the invention.
Figure 4A:
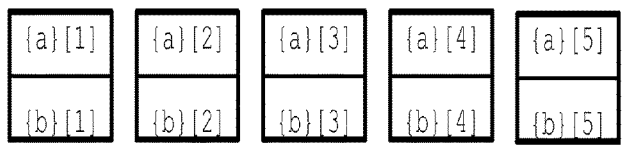
Figure 4A:
Figure 4A:
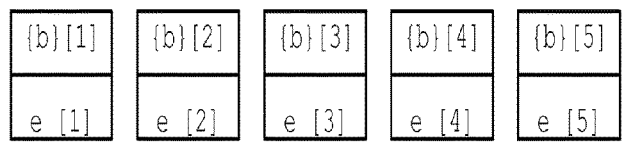
Figure 4A:
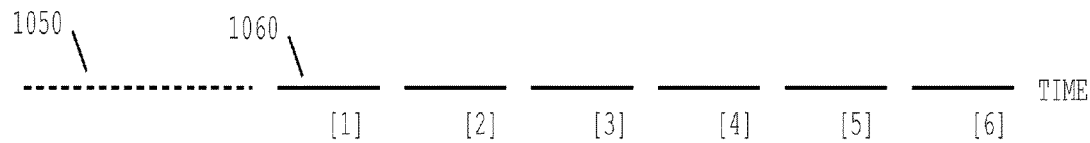
Figure 4B:
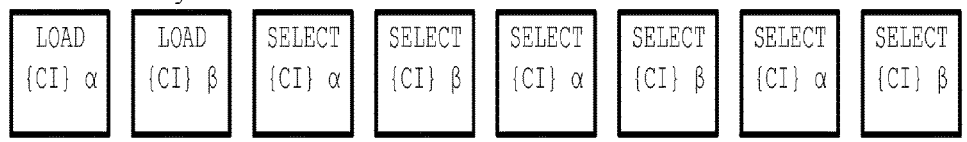
Figure 4B:
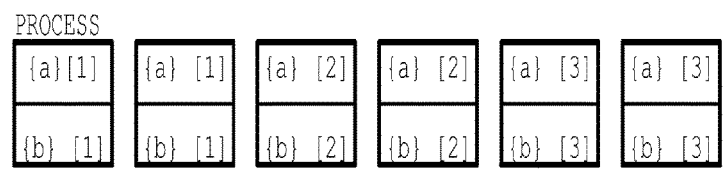
Figure 4B:
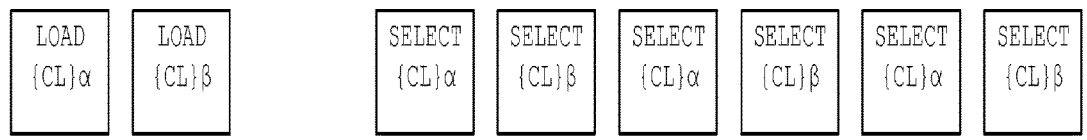
Figure 4B:
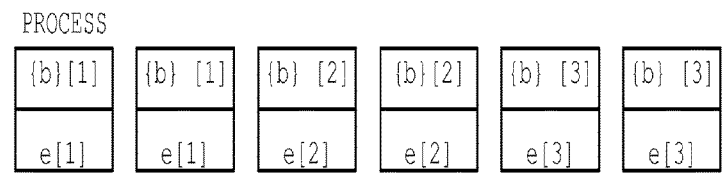
Figure 4B:
Figure 4C:
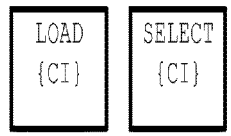
Figure 4C:
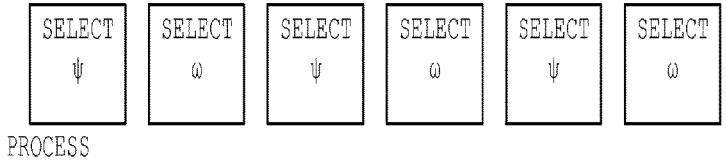
Figure 4C:
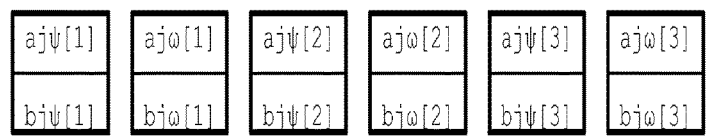
Figure 4C:
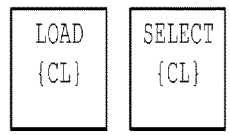
Figure 4C:
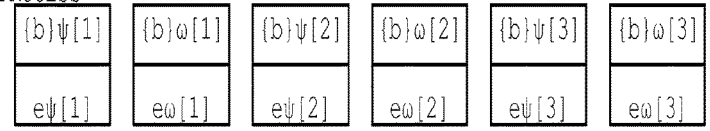

FIGS. 4A to 4C illustrate pipelining by time diagrams of processing units 410-1 . . . 410-j . . . 410-N (collectively 410) with configuration buffers 481-1 . . . 481-j . . . 481-N (collectively 481) and processing unit 420 with configuration buffer 482. Processing contexts and equipment contexts are distinguished between the figures. For simplicity, the illustration shows units 410 and buffers 481 by bold frames, just to indicate that a plurality of units and buffers operate in parallel (e.g., N units, N buffers).

In a loading step ("LOAD"), the configuration {{C}}={CI}, {CL} is loaded to the configuration buffers. Once the configuration is loaded, it remains in the buffer unchanged until a new configuration is loaded.

In a selecting step ("SELECT"), the configuration {{C}} (of the buffers) is applied by the processing units. Buffers and processing units are arranged in close physical proximity, so that a delay in the communication from the buffers to the units can be neglected.

In a processing step ("PROCESS"), the processing units process input values (in) to output data values (out) (i.e., equipment data value {a} to intermediate data values {b}, to output data values) according to the numerical transfer functions.

Progress of time is illustrated from the left to the right of the figure. Horizontal dashed lines symbolize the preparation time in that loading step 1050 (cf. FIGS. 10 and 11) is performed. Equipment data values are not yet processed; however configurations could be loaded at any time later.

Horizontal solid lines symbolize processing 1060 (at processing time, or run-time). Time periods in [ ] are illustrated with reference to the equipment data values {a}. During time period [1] the first equipment data values {a} are present for processing, during [2] the second equipment data values {a} are present and so on. For simplicity of explanation the periods are symbolized to have equal duration. However, loading might take more than one period, but buffering avoids reloading the configuration.

The example of FIG. 4A illustrates the operation of the processing device with switching the configuration switching between {C} α and {C} β. Loading includes to load the configuration {CI} j to buffers 481, both as {CI} α and {CI} β (in any order), and to load the configuration {CL} to buffer 482, both as {CL} α and {CL} β (in any order as well). Upon receiving selection signal α, processing units 410 uses {CI} α (from buffers 481). Selection signal α is also received by processing unit 420 that uses {CL} α (from buffer 482).

At time period [1], units 410 process {a} [1] to {b} [1] according to a. At time period [2], units 410 process {a} [2] to {b} [2] and unit 420 processes {b} [1] to {e} [1]. (The output {e} is available with a processing delay). At time period [3], units 410 process {a} [3] to {b} [3] and unit 420 processes {b} [2] toe {2}. In other words, 3 consecutive equipment data values (at times [1], [2] and [3] are processed according to configuration {C} α.

From [4], the configuration switches to {CI} β for the next periods [4], [5] and [6] so that from [5], the output e [4] is available as calculated under configuration β.

The example of FIG. 4B illustrates the operation of the processing device with alternatively switching the configuration between {C} α and {C} β but with using all input data values {a}. In comparison to the approach of FIG. 4A, the equipment data values are present for longer time periods. This can be accomplished by providing input data values {a} at a lower sampling frequency. If the sampling frequency for {a} should remain unchanged (time periods as in FIG. 3A), "odd" {a} (at [1], [3], [5] . . . ) would be processed according to {C} α and "even" {a} would be processed according to {C} β. The person of skill in the art can apply further options.

As in the example of FIG. 4A, loading in FIG. 4B includes to load the configuration {CI} to buffers 481, both as {CI} α and {CI} β (in any order), and to load the configuration {CL} to buffer 482, both as {CL} α and {CL} β (in any order as well).

The processing units are selected to configuration {C} α. In time period [1], units 420 process {a} [1] to {b} [1] according to a and—once selected to {CI} β process {a} [1] to {b} [1] according to β. At the end of [1], unit 420—selected to {CL} α—processes {b} [1] to e [1] (in the example a scalar). In [2], units 420 are selected to process {a} [1] to {b} [1] according to α and to β. At the beginning of [2], unit 420—selected to {CL} β—processes {b} [1] to e [1] and at the end of [2], unit 420—selected to {CL} α—processes {b} [2] to e [2].

As a consequence, the equipment behavior output (e) is provided (at half time periods) alternatively according to α or β. The output (b) can be further processed by multiplexing [not illustrated].

The example of FIG. 4C illustrates the operation of the processing device with alternating equipment data values {a} ψ and {a} ω that are multiplexed by selector 492. The output b is provided for e ψ and e ψ and can be multiplexed to allow further processing.

Figure 5:
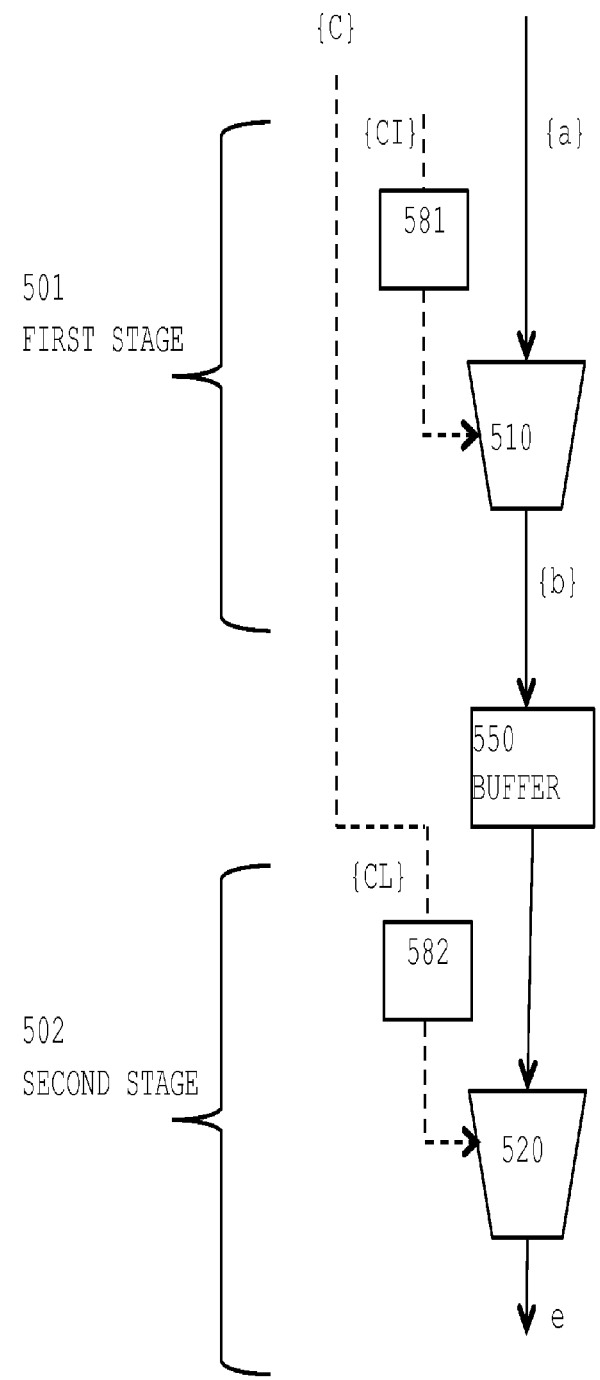
FIG. 5 illustrates a block diagram of the data processing device in an embodiment with a serial architecture.

FIG. 5 illustrates a block diagram of data processing device 500 in an embodiment with a serial architecture. Device 500 has first processing stage 501 and second processing stage 502. First processing stage 501 comprises processing unit 510 for initial processing according to numerical transfer functions FI1 . . . FIj . . . FIN. Processing unit 510 receives equipment data values {a} { a1 . . . aj . . . aN} (as input) serially and processes the equipment data values to intermediate data values {b} {b1 . . . bj . . . bN} (as output) serially. More in detail, in a first time period, processing unit 510 processes a1 to b1 according to FI1. In a second time period, processing unit 510 processes a2 to b2 according to FI2, in a further period, processing unit 510 processes aj to bj according to FIj and so on.

First processing stage 501 has an intermediate data buffer 550 coupled to processing unit 510 to store the intermediate data values {b}.

Second processing stage 202 comprises processing unit 520 for final processing with numerical transfer function FL, in the example—as in FIG. 2—a matrix multiplication to the N intermediate values {b} to a scalar product e. Processing unit 520 accesses {b} from intermediate data buffer 550.

Configuration buffers are provided as well: configuration buffers 581 at unit 510, and configuration buffer 582 at unit 520. Configuration bus 575 symbolizes the distribution of the configuration {{C}} to the buffers, {CI} to buffer 581 and {CL} to buffer 582.

Those of skill in the art can apply the context switching (cf. FIG. 2A, FIGS. 4A to 4C) to the serial architecture without the need of further explanation herein. Looking at the performance, device 500 with the serial architecture uses a single unit 510 where device 200 with the parallel architecture uses N units 210. However, device 500 needs intermediate data buffer 550 and operates with more time periods (e.g., N-1 additional periods for processing in stage 501).

The parallel and the serial approach and—optionally—the equipment context switch—can be combined, for example, in situations where the number of data values (i.e., sensors) exceeds the number of processing units. For example, 16 data values could be serialized in 2 phases to 8 processing units.

Figure 6:
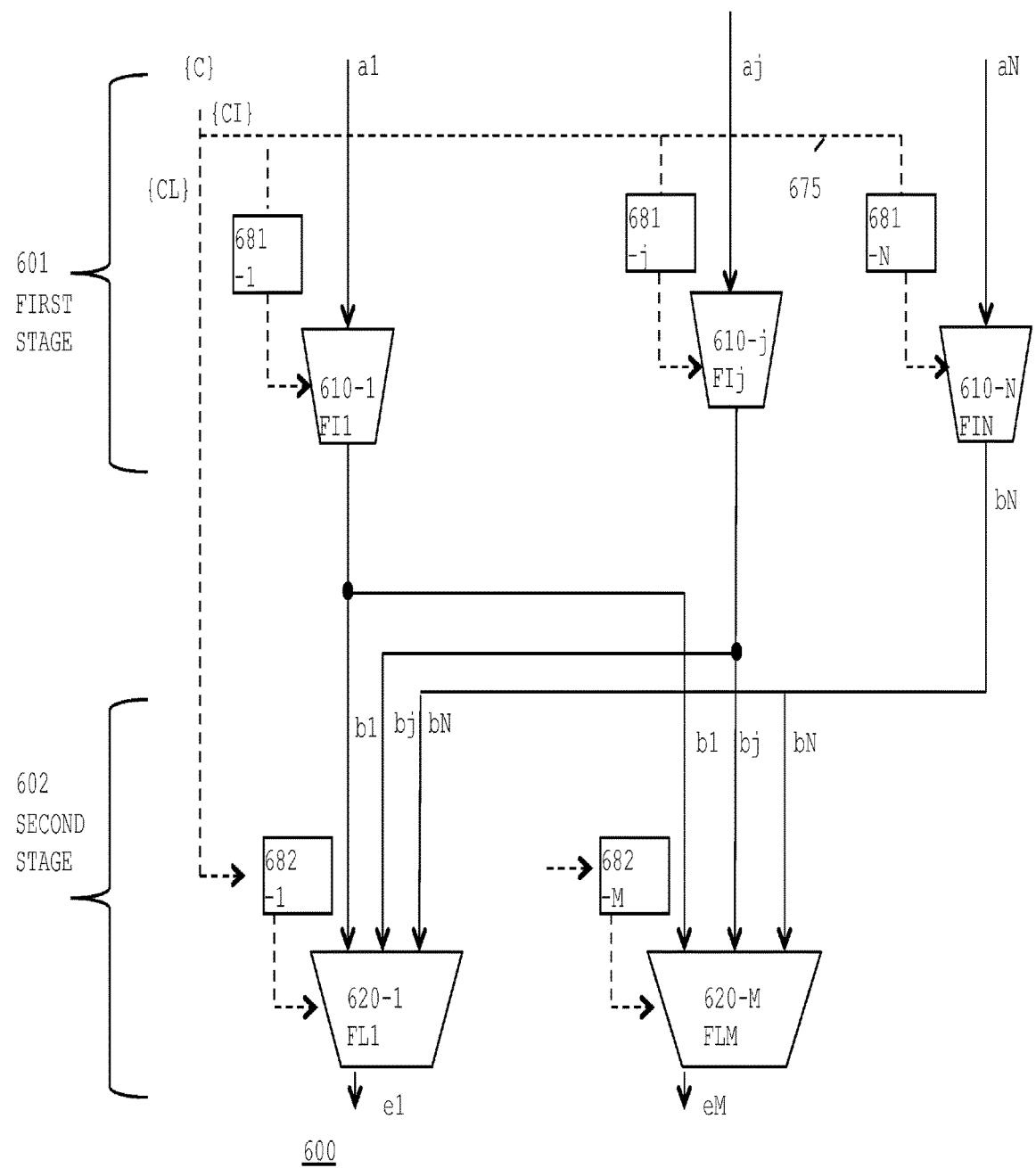
FIG. 6 illustrates a block diagram of the processing device in an embodiment with a modified connection between the first processing stage and the second processing stage.

FIG. 6 illustrates a block diagram of processing device 600 in an embodiment with a modified connection between first processing stage 601 and second processing stage 602.

First processing stage 601 has N processing units 610-1 . . . 601-*j* . . . 610-N, and has N configuration buffers 681-1 . . . 681-*j* . . . 681-N, coupled to the units. Second processing stage 602 has M processing units 620-1 to 620-M, and has M configuration buffers 682-1 to buffer 682-M, coupled to the units. For simplicity, stage 602 is illustrated with M =2. The numerical transfer functions are FI1 . . . FI*j* . . . FIN for units 610-1 . . . 610-*j* . . . 610-N and FL1 . . . FLM for units 620-1 . . . 620-M. The buffers load the configurations (e.g., {CI} {CL} via bus 675, or otherwise.

As illustrated in the example, FL1 receives b1, bj and bN, and FLM also receives b1, bj and bN. Other combinations are also possible. The combination of the intermediate data values {b} to processing units of the subsequent stages (here: units 620 of stage 602) can be configurable (via a network), similar to the configuration of the numerical transfer functions. The inter-stage connections can also be coupled by traditional integrated circuit wiring.

The output data value is a vector {e} with e1 to eM. The number M can be equal to, larger than N or smaller than N. M=1 corresponds to the approach illustrated in FIGS. 2A and 2B.

Figure 7:
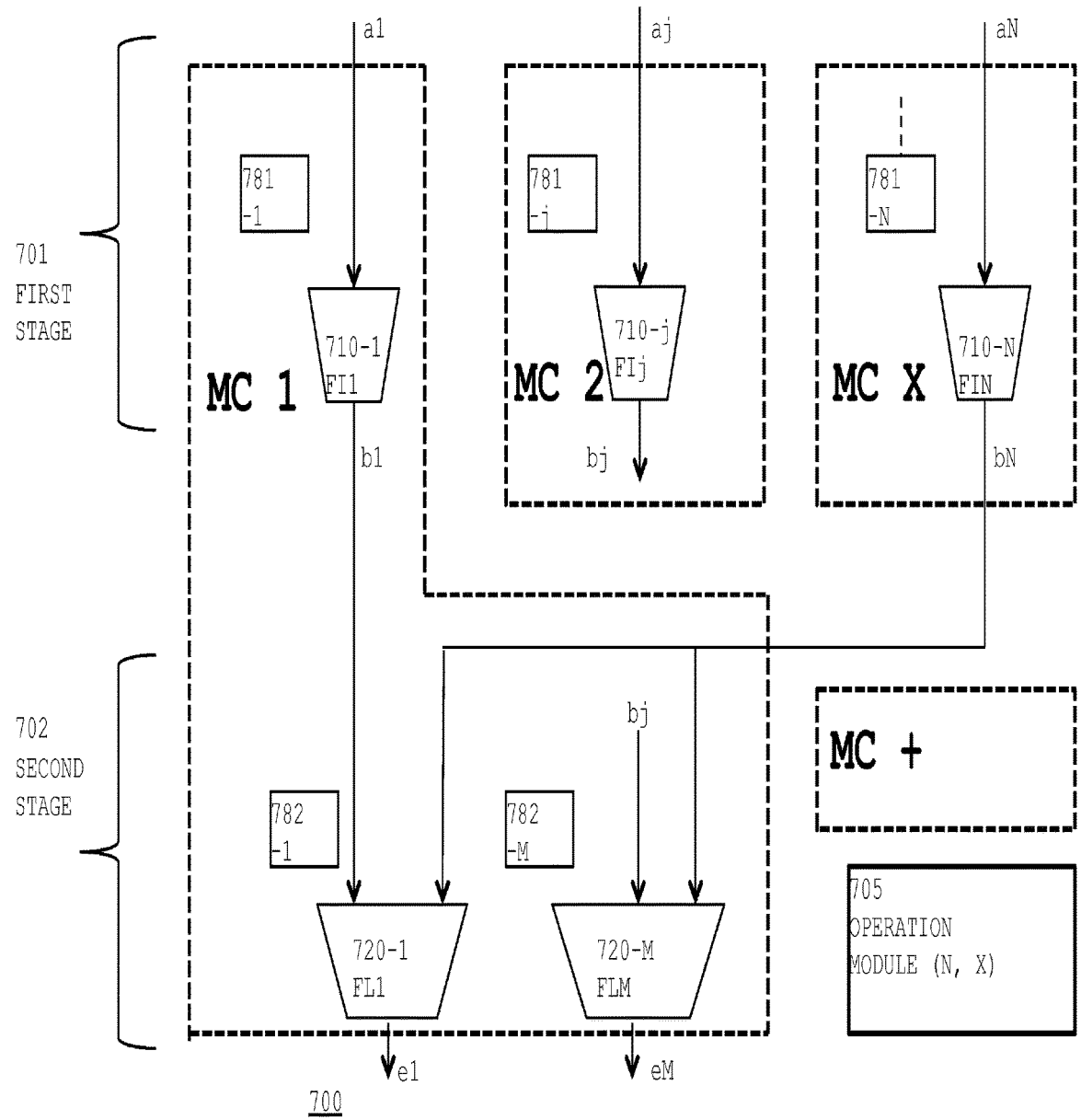
FIG. 7 illustrates a block diagram of the data processing device in an embodiment with functionality distributed over several processor cores.

FIG. 7 illustrates a block diagram of data processing device 700 in an embodiment with functionality distributed over several (X) processor cores MC 1, MC 2 and MC X. The overall number of processor cores (plurality of processors cores, processor core array) can be higher, in the example, there are 4 cores, but only X=3 are selected, and core MC + is not selected.

In other words, the processing units (cf. the other figures) are implemented by programmable processor cores Similar to the embodiment illustrated in FIG. 6, device 700 has processing stage 701 with processing units 710-1 . . . 710-*j* . . . 710-N and corresponding buffers 781-1 . . . 781-*j* . . . 781-N as well as processing stage 702 with processing units 720-1 . . . 720-M and corresponding buffers 782-1 . . . 782-M. The functionality is implemented by processor cores MC 1, MC 2 to MC X (dashed surrounding lines). The cores belong to a single processor or to multiple processors. The configuration {{C}} can be distributed by a dedicated bus (cf. FIG. 2, FIG. 6), via direct memory access (DMA) or otherwise. A similar distribution applies to the functions {F}.

Operation module 705 symbolizes functionality that is implemented by one or more cores to prepare device 700 to operate as a data processing device described above. Module 705 allocates resources (e.g., selects processor cores, or assigns memory to the processors), supports the provision of functions (to the selected cores), and supports to load the configuration. In other words, module 705 is a module to control the operation.

Operation module 705 is adapted to select the microprocessor cores (MC 1, MC 2, MC X) from the plurality of microprocessors according to (i) the availability of the cores (e.g., X=3 available) and according to presence of equipment data values ({a}) from the equipment (105).

In the example embodiment of FIG. 7, MC 1 implements unit 710-1 with buffer 781-1, units 720-1, 720-M with buffers 782-1, 782-M; MC 2 implements unit 710-*j* with buffer 781-*j*; and MC X implements 710-N with buffer 781-N. The allocation (or assignment) of functional elements (units, buffers) to processors can be performed by operation module 705 according to pre-defined allocation rules that receive the number N of equipment data values {a} and the availability of processor cores. Much simplified, the availability of the cores corresponds to the number X of cores, but the rules can receive further factors, such as processor core usage (by other programs). In the example of FIG. 7, core MC 1 has sufficient capacity to implement 3 units/buffers, but MC 2 is occupied otherwise and can implement only one unit/buffer.

Persons of skill in the art can choose a suitable processor, such as a microprocessor with a Reduced Instruction Set Computer (RISC) architecture. An example for a RISC processor is the well-known ARM processor.

Figure 8:
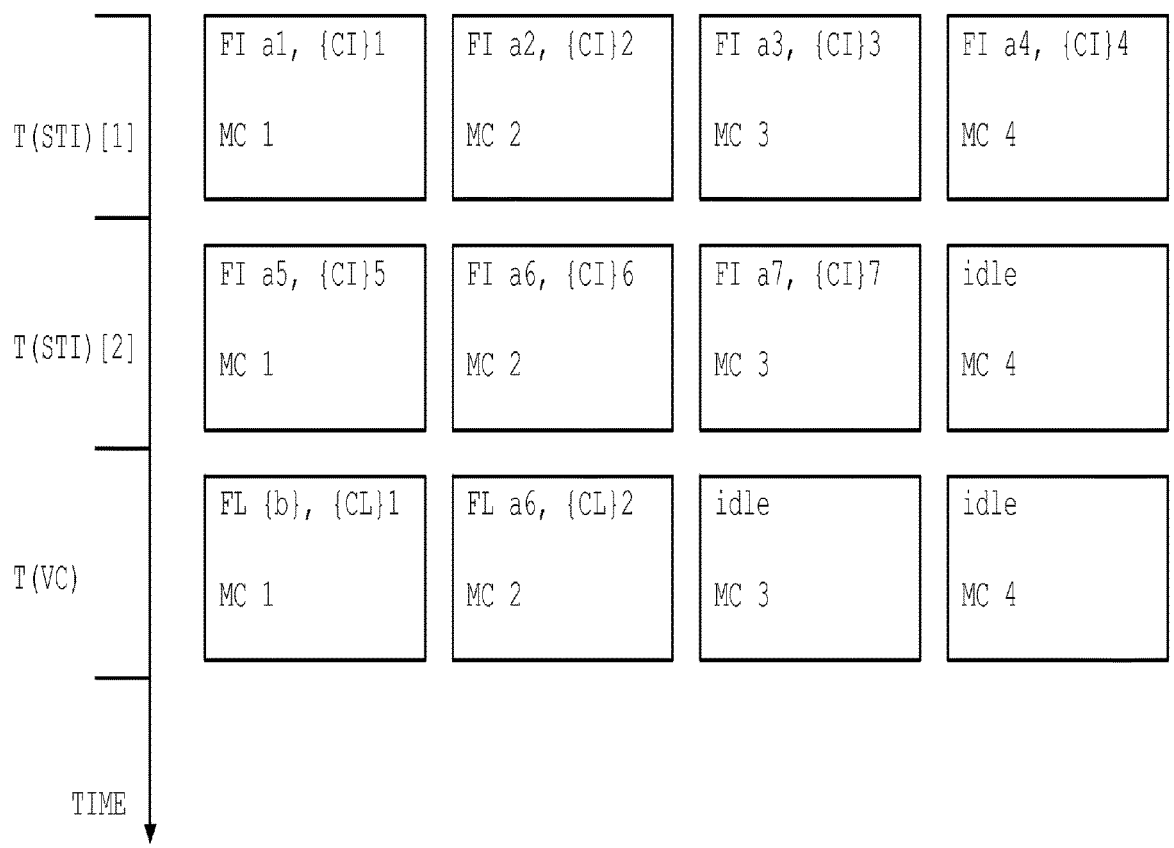
FIG. 8 illustrates a time diagram of the processing device in an embodiment with processor cores.
Figure 9:
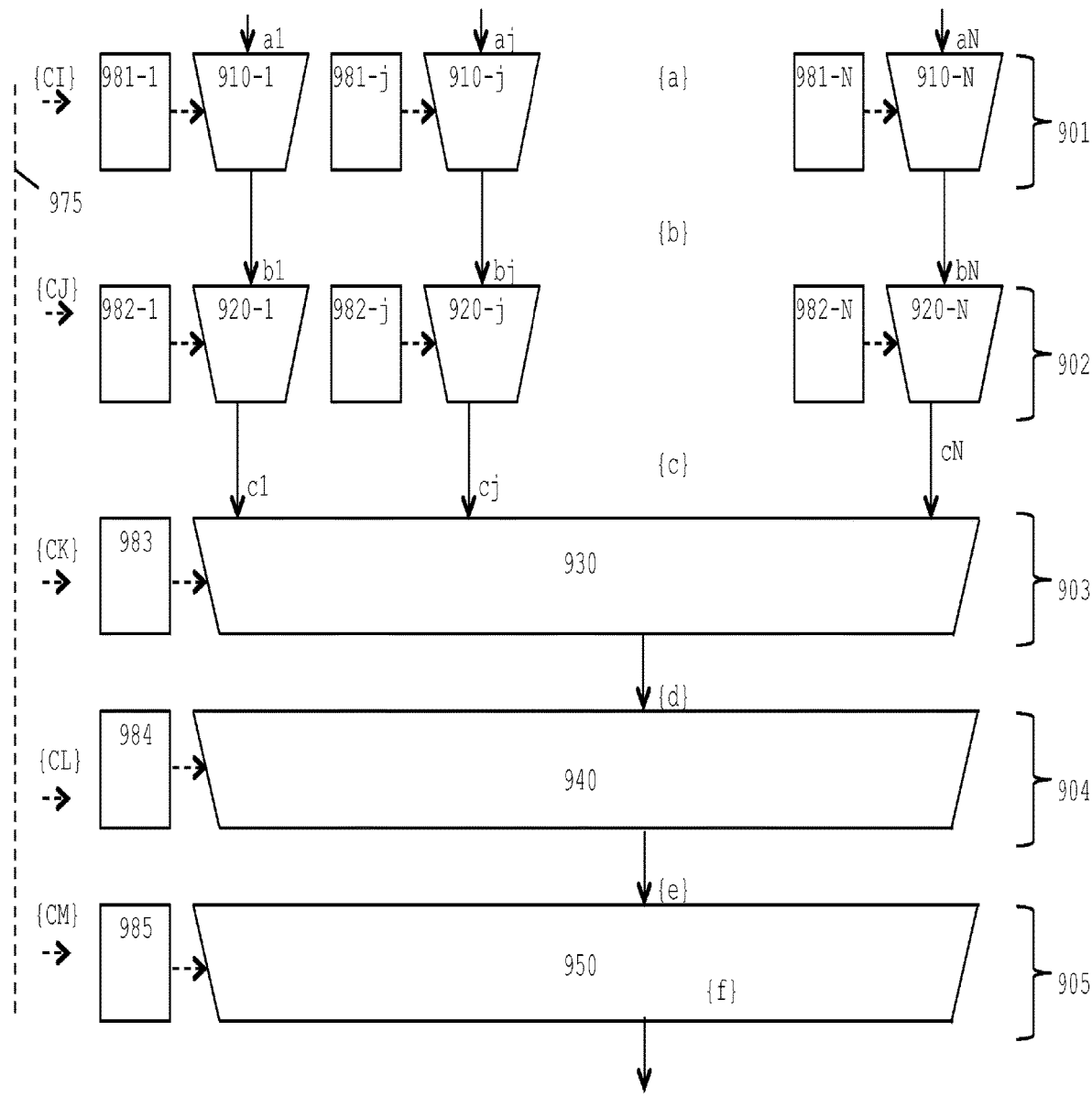
FIG. 9 illustrates a block diagram of the data processing device in an embodiment with a five stage architecture.

FIG. 8 illustrates a time diagram of processing device 800 in the embodiment with processor cores (processor core array). In the example, there are N=7 equipment data values {a} { a1, a2, a3, a4, a5, a6, a7} but only X=4 processor cores MC 1, MC 2, MC 3 and MC 4. The X=4 cores could belong to a so-called quadcore processor. To accommodate this situation, the processing device uses serialization with a serialization factor K=2.

In a first time slot (T(STI)[1]—scalar transformer input), a1, a2, a3 and a4 are converted to intermediate values b1, b2, b3 and b4 by MC 1, MC 2, MC 3 and MC 4 according to function FI with channel specific configurations {CI} 1, {CI} 2, {CI} 3 and {CI} 4. The intermediate values are buffered.

In a second time slot (T(STI)[1]), a5, a6 and a7 are converted to intermediate values b5, b6 and b7 by MC 1, MC 2 and MC 3, according to FI with {CI} 5, {CI} 6 and {CI} 7. In the example, MC 4 remains idle, in the sense that MC 4 does not contribute to processing during the second time slot. All intermediate values b1 to b7 are now available for further processing.

In a third time slot (T(VC—vector compression), the intermediate values are further processed by MC 1 and MC 2 according to configurations {CL} 1 and {CL} 2 of a function FL.

The serialization factor K can be calculated, for example by rounding up N over X (7/4-->2). Persons of skill in the art can arrange MC 4 not to stay idle, but in the current example, the overhead in the resources to operate MC 4 all of the time would justify this.

FIG. 9 illustrates a block diagram of data processing device 900 in an embodiment with a five-stage architecture.

Device 900 has processing stages 901, 902, 903, 904 and 905 that implement functions {FI}, {FJ}, {FK}, {FL} and {FM}. Data values are {a}, {b}, {c} (e.g., vectors) as well as {d}, {e}, {f} (e.g., scalars). Configuration bus 975 is provided to distributed the configuration {C} that function-specific is classified into {CI}, {CJ}, {CK}, {CL} and {CM}.

Processing stage 901 comprises processing units 910-1 ... 910-$j$ ... 910-N that are coupled to corresponding configuration buffers 981-1 ... 981-$j$ ... 981-N.

Processing units 910-1 ... 910-$j$ ... 910-N receive equipment data values {a} {a1 ... aj ... aN}. Function {FI} is a scalar transformer input (STI) function with configuration {CI} in that the single values aj are transformed to single intermediate values bj. Function {FI} has been explained in connection with FIG. 2 (first stage).

Processing stage 902 comprises processing units 920-1 ... 920-$j$ ... 920-N that are coupled to corresponding configuration buffers 982-1 ... 982-$j$ ... 982-N. Function {FJ} is a scalar transformer correction (STC) function with configuration {CJ} in that the single intermediate values bj are transformed to single intermediate values cj. Function {FJ} is similar to function {FI} (cf. FIG. 2, first stage).

Processing stage 903 comprises processing unit 930 that is coupled to corresponding configuration buffer 983. Function {FK} is a vector transformer (VT) function with configuration {CK} in that the single intermediate values cj are transformed to intermediate values {d} (vector with N elements).

Processing stage 904 comprises processing unit 940 that is coupled to corresponding configuration buffer 984. Function {FL} is a vector compression (VC) function with configuration {CL} in that the intermediate values {d} are transformed in a different vector {e}. Vector {e} has M elements, with M<N. M can be set from outside, via a configuration, but a default value is M=1 so that {e} becomes a scalar.

Processing stage 905 comprises processing unit 950 that is coupled to corresponding configuration buffer 985. Function {FM} is a scalar transformer output (STO) function with configuration {CM}. Unit 950 receives at least a single intermediate value ({e} =e for M=1), and provides output value f (equipment behavior), in the example, a scalar.

As explained above in connection with FIGS. 4A to 4C, it takes a number of time periods for the last stage to provide an output value. Such latency depends on the number of stages, as the case may be on multiplexing input data selections and processing configurations. In the example of device 900, the time difference between receiving equipment data values (e.g., {a}) and providing an behavior data values {e.g., result {f}) can be calculated as a delay time (T DELAY) being the sum of the stage delays:

$TDELAY=T1+T2+T3+T4+T5$, or $TDELAY=T(STI)+T(STC)+T(VT)+T(VC)+T(STO)$.

FIG. 10A illustrates a table with actions and different processing options. To characterize the behavior of observed equipment 105, the following activities are performed: collecting 1010 historic data, pre-processing 1020 the historic data to configuration {{C}}, allocating 1030 processing resources, providing 1040 functional definitions {F} to the allocated processing resources, loading 1050 the configuration {{C}} to the processing resources, and processing 1060 equipment data to detect the behavior. FIG. 10A illustrates the actions in the column on the left, as in a flow chart diagram for method 1000.

For the last action—processing equipment data—there are embodiments with different processing resources: option (a) corresponds to the data processing device if implemented with dedicated hardware (e.g., FPGA) and option (b) corresponds to the data processing device if implemented by microprocessor cores (cf. FIGS. 7, 8). Some of the previous actions are optimized in a different way depending on the option.

Collecting 1010 historic data is performed by equipment 104 in combination with processing configurator 115. Pre-processing 1020 the historic data to configuration {{C}} is performed by processing configurator 115. The action does not need to distinguish between options (a) and (b) so that the configuration {{C}} can flexibly be used for both.

Some of the further actions are different.

For option (a), allocating 1030 processing resources is implicitly made when the device is coupled to the sensors. If the device has a parallel architecture (cf. the example in FIGS. 2 and 2B, FIGS. 4A to 4C, FIG. 6, FIG. 9), the number of processing units (at least of the first stage) corresponds to the number of channels of equipment data {a}, for example N.

For option (b), allocating 1030 processing resources is different. The operation module (cf. 705) selects the cores according to a variety of allocation parameters, such as the number of data channels and to core availability. In the processor core array, some of the cores might not be available. Processing has to be distributed to particular cores. As described with respect to the example of FIG. 8, the microprocessor cores can be related to equipment data channels, wherein serializing is an option. As described with respect to the example of FIG. 7, microprocessor core scan also be selected according to their availability (in view that the core perform other programs). The operation module can allocate memory to the selected cores accordingly.

For option (a), providing 1040 functional definitions {F} is performed when the hardware is manufactured (hard-wired logics) or when the FPGA is programmed (control signals to the programmable gates). For example, the threshold function of FIG. 3A, 3B is provided with a single threshold i and two outputs o1 and o2, but with a mapping to particular functional values.

For option (b) providing 1040 functional definitions {F} is performed by loading program instructions to the selected microprocessor cores and to the assigned memory. This can be arranged by operation module (705). There are different ways organize this: (i) The source code could be forwarded to the operator, and the operator compiles the source code to machine code depending on the particular processor (and operating system), or—optionally—depending on the cores (or even the selected cores). (ii) Ready-to-use code could be available in a database with properties of particular processors (and operating systems). The functional definitions include data structures for receiving the configuration.

Loading 1050 the configuration is performed by loading the configuration to the buffers (a), or to registers, to the main memory etc. or—more in general—to the mentioned data structures for (b). For option (b), the operation module (705) can be used as well.

Processing 1060 equipment data to characterize behavior is performed as described above, by receiving and processing equipment data by the (configured) functions, as described above.

Figure 10B:
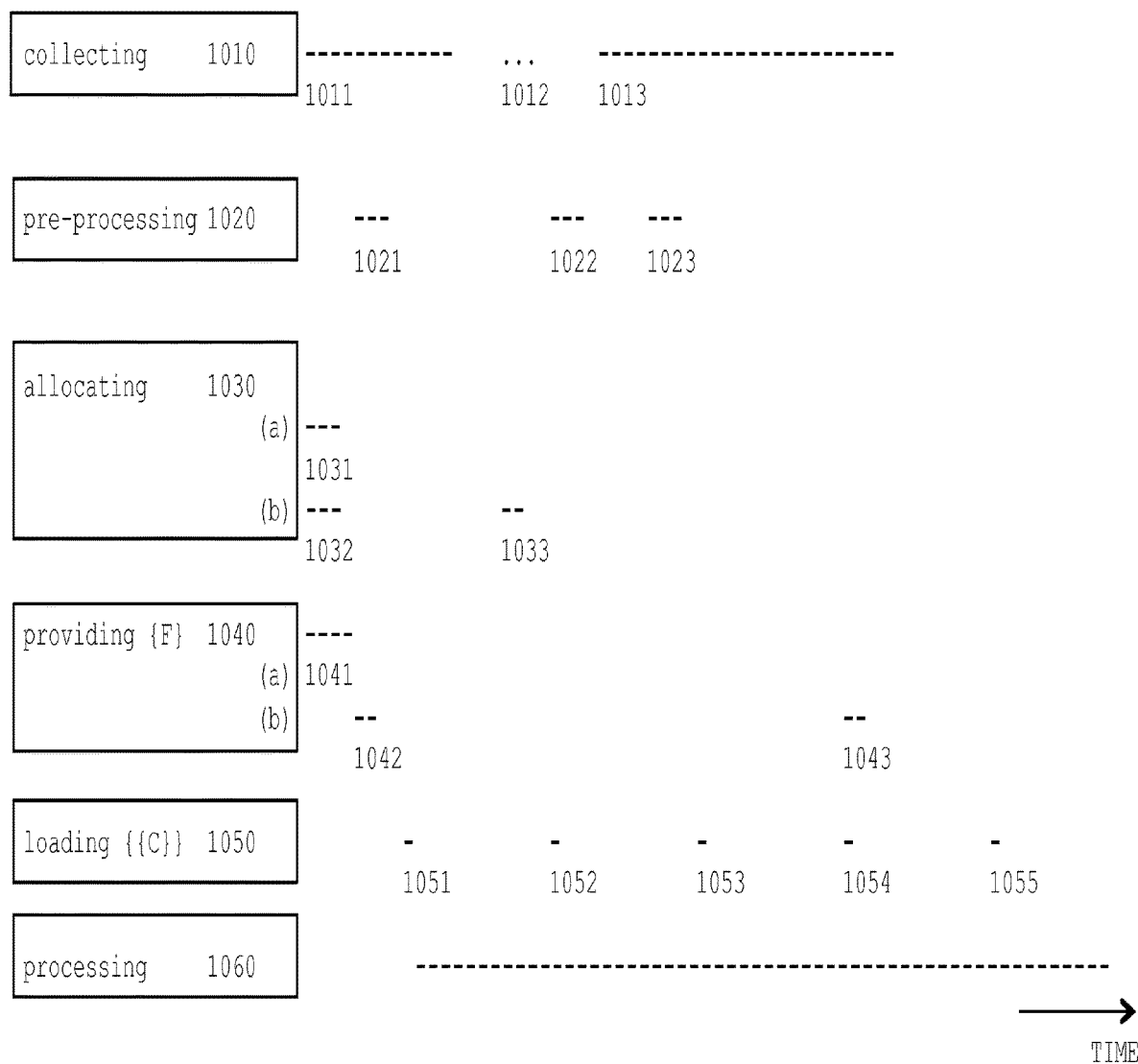

FIG. 10B illustrates the scenario with different time aspects, with horizontal lines indicating the progress of time (from left to right) for the different actions. It may be advantageous that the actions (or method steps) can be performed at different points in time. This accommodates different availability of historic data 114, configurations {{C}}, functions {f} and equipment data {a}, and also accommodates different durations and resource consumption of actions.

Collecting 1010 historic data is—in principle—a single action 1011, but to enhance accuracy, an on-going collection 1013 can be performed. Interruptions 1012 are possible, at any time.

Pre-processing 1020 the historic data to configuration {{C}} is performed at least once 1021 (after having collected at least some historic data), but providing new configurations {{C}} by repeated pre-processing 1022, 1023 is possible.

Allocating 1030 processing resources is performed once for option (a) 1031, or in repetitions (re-allocations) for option (b) 1032, 1033. Allocating for option (b) can include modifying the firmware (e.g., of the core array). As mentioned, it is also possible to use dedicated acceleration core in a system-on-chip (SoC) circuit, so that the manufacturing steps to produce such a circuit belong to allocating.

Receiving functional definitions {F} and providing 1040 them to resources is performed upon designing the hardware (option (a), 1041), or after selecting the cores (option (b), 1042). Repetitions are possible (1043), for example, for firmware updates or in case of re-allocations.

Loading configuration 1050 {{C}} to processing resources, is performed when preprocessing 1020, allocating 1030, and providing 1040 has been performed, for example, as initial loading 1051, or configuration updates 1052, 1053, 1054, 1055.

Processing 1060 equipment data to characterize behavior can be an ongoing process provided that the other steps are performed.

Looking at the frequency of actions, the time interval between subsequent processing (e.g., 1021, 1022, 1023) can be similar to the time interval between subsequent loading (e.g., 1051 to 1055). In an embodiment, the operator (of the processing device and of the equipment) receives updates from the operator of the processing configurator on a regular basis, for example, every week or every month.

Providing functional definitions (e.g., 1042, 1043) may be performed with less repetitions, or repetitions at longer intervals. For options (b) this can be performed after re-allocating (if the number of cores changes). Providing a functional definition may take more time than loading a configuration (e.g., programming an FPGA vs. programming a resister; program instructions vs. input/output values). In other words, providing 1040 functions and loading 1050 the configuration is repeated but providing has a lower repetition rate than loading.

The activities providing functional definitions {F} to resources 1040 and loading configuration {{C}} 1050 to processing resources can be combined.

For example, a single file can contain {F} and {{C}} for initialization and for updates of {{C}} even if {F} remains unchanged. Separate distribution is possible, to save bandwidth (but with higher complexity). In the example of FIG. 11, providing 1043 and loading 1054 is performed at the same time.

FIGS. 10A and 10B also illustrate a computer program or a computer program product. The computer program product—when loaded into a memory of a computer and being executed by at least one processor of the computer—performs the steps or action of the computer-implemented method. So in other words, the blocks stand for program modules and illustrate that the method can be implemented by a computer under the control of the program.

Embodiments of the invention can be implemented in digital electronic circuitry, or in computer hardware, firmware, software, or in combinations of them. The invention can be implemented as a computer program product, for example, a computer program tangibly embodied in an information carrier, for example, in a machine-readable storage device, for execution by, or to control the operation of, data processing apparatus, for example, a programmable processor, a computer, or multiple computers. A computer program as claimed can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network. The described methods can all be executed by corresponding computer products on the respective devices, for example, the first and second computers, the trusted computers and the communication means.

Method steps of the invention can be performed by one or more programmable processors executing a computer program to perform functions of the invention by operating on input data and generating output. Method steps can also be performed by, and apparatus of the invention can be implemented as, special purpose logic circuitry, for example, a field programmable gate array (FPGA) or an application-specific integrated circuit (ASIC).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, optical disks or solid state disks. Such storage means may also provisioned on demand and be accessible through the Internet (e.g., Cloud Computing). Information carriers suitable for embodying computer program instructions and data include all forms of non-volatile memory, including by way of example semiconductor memory devices, for example, EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, for example, a cathode ray tube (CRT) or liquid crystal display (LCD) monitor, for displaying information to the user and an input device such as a keyboard, touchscreen or touch pad, a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

The invention can be implemented in a computing system that includes a back-end component, for example, as a data server, or that includes a middleware component, for example, an application server, or that includes a front-end component, for example, a client computer having a graphical user interface or a Web browser through which a user can interact with an implementation of the invention, or any combination of such back-end, middleware, or front-end components. Client computers can also be mobile devices, such as smartphones, tablet PCs or any other handheld or wearable computing device. The components of the system can be interconnected by any form or medium of digital data communication, for example, a communication network. Examples of communication networks include a local area network (LAN) and a wide area network (WAN), for example, the Internet or wireless LAN or telecommunication networks.

The computing system can include clients and servers. A client and a server are generally remote from each other and typically interact through a communication network. The relationship of client and server arises by virtue of computer programs running on the respective computers and having a client-server relationship to each other.

REFERENCES 100, 200, 500, 600, 700, 800, 900 data processing device
114 historic data
115 processing configurator
104-1 . . . 104-g . . . 104-G; 104 fleet of equipment
105 equipment under observation
106 feedback loop
191, 291 processing context selector
192, 292, 492 equipment context selector, multiplexer
201, 501, 601, 701, 901 first processing stage
202, 502, 602, 702, 902 second processing stage
210-1 . . . 210-j . . . 210-N, 310-j, 510, 610-1 . . . processing units (first stage)
610-j . . . 610-N, 710-1 . . . 710-j . . . 710-N, 910-1 . . . 910-j . . . 910-N
220, 420, 520, 620-1 . . . 620-M, 720-1 . . . 720—processing unit (second stage)
M, 920-1 . . . 920-j . . . 920-N
275, 575, 675, 975 configuration bus
281-1 . . . 281-j . . . 281-N, 282, 381-j, 481-j, configuration buffers
481, 482, 581, 582, 681-1 . . . 681-j . . . 681-N, 682-1 . . . 682-M, 781-1 . . . 781-j . . . 781-N, 782-1 . . . 782-M, 981-1 . . . 981-j . . . 981-N, 982-1 . . . 982-j . . . 982-N
550 intermediate data buffer
705 operation module
903, 904, 905; 930, 940, 950, 983, 984, 985 further stages, units, buffers
10** actions, action time, method
[1], [2], [k] indicating process of time
{a}, { a1 . . . ai . . . aN} equipment data values
{b}, {b1 . . . bi . . . bN}; {c}, {d} intermediate data values
{{C}} configuration
{CI}, {CJ}, {CK}, {CL}, {CM} stage configurations
{{C}} $\alpha$ configuration of a first processing context
{{C}} $\beta$ configuration of a second processing context
{CI} 1 . . . {CI} i . . . {CI} N configuration, distinguished for N units
{e}, {f} behavior data values, result
i~, i1, i2 input specific to numerical transfer function
j index (input values, equipment data values, input processing units)
K serialization factor
N number of input values, equipment data values, number of input processing units
{FI}, {FI1 . . . FIj . . . FIN}, FJ, FK, FL, FM numerical transfer functions
o~, o1, o2 input specific to numerical transfer function
x threshold (for an example function)
Xno number of processor cores
$\alpha$ first processing context
$\beta$ second processing context
$\psi$ first equipment context
$\omega$ second equipment context

What is claimed is:

1. A data processing device for characterizing behavior properties of equipment under observation, the data processing device comprising:
   a processor core array comprising two or more processor cores configured to select processor cores of the two or more processor cores as a first processing stage and processor cores of the two or more processor cores as a second processing stage according to an availability of the processor cores and according to a presence of equipment data values from an equipment under observation, wherein:
   the processor cores of the first processing stage receive two or more equipment data values from the equipment under observation as input and provide two or more intermediate data values as output, according to two or more first numerical transfer functions, and wherein the processor cores of the second processing stage receive the two or more intermediate data values as input and provide behavior data as output values according to a second numerical transfer function;
   the selected processor cores process input values based on numerical transfer functions to output values by implementing an input-to-output mapping based on a configuration obtained by a pre-processing of historic data from two or more master equipment and related to the behavior properties of the equipment under observation; and
   the output values predict future behavior properties of the equipment under observation.

2. The data processing device of claim 1, wherein equipment data values comprise values transmitted to the data processing device by sensors operatively associated with the equipment under observation.

3. The data processing device of claim 2, further comprising the processor core array:
   assigning, in a memory operatively associated with the data processing device, data structures to operate as configuration buffers; and
   assigning a data structure to receive a first configuration of a first processing context and assigning a data structure to receive a second configuration of a second processing context, and wherein the processor core array selects two or more processor cores to process data values using the first and second configurations in response to equipment data values transmitted to the data processing device by sensors operatively associated with the equipment under observation.

4. The data processing device of claim 1, wherein each equipment data value received as input corresponds to a single output value.

5. The data processing device of claim 1, wherein an equipment data value received as input corresponds to a plurality of output values, and each output value predicts a behavior property of the equipment under observation.

6. The data processing device of claim 1, wherein one or more processor cores comprises a field-programmable gate array.

7. The data processing device of claim 1, wherein a configuration bus distributes the configuration to the selected processor cores.

8. A computer-implemented method for operating a data processing device to characterize behavior properties of equipment under observation, the computer-implemented method comprising:
   selecting processor cores of a processor core array comprising two or more processor cores as a first processing stage and processor cores of the two or more processor cores as a second processing stage, according to an availability of the processor cores and according to a presence of equipment data values from an equipment under observation, wherein the processor cores of the first processing stage receive two or more equipment data values from the equipment under observation as input and provide two or more intermediate data values as output, according to two or more first numerical transfer functions, and wherein the processor cores of the second processing stage receive the two or more intermediate data values as input and provide behavior data as output values according to a second numerical transfer function; and
   processing input values, by the selected processor cores, based on numerical transfer functions to output values by implementing an input-to-output mapping based on a configuration obtained by a pre-processing of historic data from two or more master equipment and related to the behavior properties of the equipment under observation, wherein the output values predict future behavior properties of the equipment under observation.

9. The computer-implemented method of claim 8, wherein equipment data values comprise values transmitted to the data processing device by sensors operatively associated with the equipment under observation.

10. The computer-implemented method of claim 9, further comprising the processor core array:
   assigning, in a memory operatively associated with the data processing device, data structures to operate as configuration buffers;
   assigning a data structure to receive a first configuration of a first processing context and assigning a data structure to receive a second configuration of a second processing context; and
   selecting two or more processor cores to process data values using the first and second configurations in response to equipment data values transmitted to the data processing device by sensors operatively associated with the equipment under observation.

11. The computer-implemented method of claim 8, wherein each equipment data value received as input corresponds to a single output value.

12. The computer-implemented method of claim 8, wherein an equipment data value received as input corresponds to a plurality of output values, and each output value predicts a behavior property of the equipment under observation.

13. The computer-implemented method of claim 8, wherein one or more processor cores comprises a field-programmable gate array.

14. The computer-implemented method of claim 8, wherein a configuration bus distributes the configuration to the selected processor cores.

15. A non-transitory computer-readable medium having stored thereon a sequence of computer-executable instructions which when executed by at least one processor of a computer performs a method for controlling a data processing device to characterize behavior properties of equipment under observation, the method comprising:
   selecting processor cores of a processor core array comprising two or more processor cores as a first processing stage and processor cores of the two or more processor cores as a second processing stage, according to an availability of the processor cores and according to a presence of equipment data values from an equipment under observation, wherein the processor cores of the first processing stage receive two or more equipment data values from the equipment under observation as input and provide two or more intermediate data values as output, according to two or more first numerical transfer functions, and wherein the processor cores of the second processing stage receive the two or more intermediate data values as input and provide behavior data as output values according to a second numerical transfer function; and
   processing input values, by the selected processor cores, based on numerical transfer functions to output values by implementing an input-to-output mapping based on a configuration obtained by a pre-processing of historic data from two or more master equipment and related to the behavior properties of the equipment under observation, wherein the output values predict future behavior properties of the equipment under observation.

16. The non-transitory computer-readable medium of claim 15, wherein equipment data values comprise values transmitted to the data processing device by sensors operatively associated with the equipment under observation.

17. The non-transitory computer-readable medium of claim 16, further comprising:
   assigning, in a memory operatively associated with the data processing device, data structures to operate as configuration buffers;
   assigning a data structure to receive a first configuration of a first processing context and assigning a data structure to receive a second configuration of a second processing context; and
   selecting two or more processor cores to process data values using the first and second configurations in response to equipment data values transmitted to the data processing device by sensors operatively associated with the equipment under observation.

18. The non-transitory computer-readable medium of claim 15, wherein each equipment data value received as input corresponds to a single output value.

19. The non-transitory computer-readable medium of claim 15, wherein an equipment data value received as input corresponds to a plurality of output values, and each output value predicts a behavior property of the equipment under observation.

20. The non-transitory computer-readable medium of claim 15, wherein one or more processor cores comprises a field-programmable gate array.

* * * * *